(12) United States Patent
Lim

(10) Patent No.: US 10,019,224 B2
(45) Date of Patent: Jul. 10, 2018

(54) ELECTRONIC DEVICE AND METHOD OF OPERATING THE SAME

(71) Applicant: SAMSUNG ELECTRONICS CO., LTD., Suwon-si, Gyeonggi-do (KR)

(72) Inventor: Byung-keuk Lim, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 15/370,314

(22) Filed: Dec. 6, 2016

(65) Prior Publication Data
US 2017/0168772 A1    Jun. 15, 2017

(30) Foreign Application Priority Data
Dec. 14, 2015  (KR) .................. 10-2015-0178513

(51) Int. Cl.
| | | |
|---|---|---|
| H04R 27/00 | (2006.01) | |
| H04R 5/04 | (2006.01) | |
| G06F 3/16 | (2006.01) | |
| H04W 4/80 | (2018.01) | |
| H04W 4/00 | (2018.01) | |
| G06F 3/0481 | (2013.01) | |
| H04W 84/12 | (2009.01) | |

(52) U.S. Cl.
CPC ............ *G06F 3/165* (2013.01); *H04W 4/008* (2013.01); *H04W 4/80* (2018.02); *G06F 3/04817* (2013.01); *H04W 84/12* (2013.01)

(58) Field of Classification Search
CPC .... G06F 3/165; G06F 3/04817; H04W 4/008; H04W 84/12

USPC ........................................................ 381/77
See application file for complete search history.

(56) References Cited

U.S. PATENT DOCUMENTS

| | | |
|---|---|---|
| RE43,915 E | 1/2013 | Lee |
| 2005/0154766 A1 | 7/2005 | Huang et al. |
| 2007/0217623 A1* | 9/2007 | Harada ............. H04N 21/2368 381/94.1 |
| 2010/0020983 A1 | 1/2010 | Wailes |

(Continued)

FOREIGN PATENT DOCUMENTS

| | | |
|---|---|---|
| EP | 2 073 512 | 11/2008 |
| WO | 2015/167204 | 11/2015 |

OTHER PUBLICATIONS

Search Report and Written Opinion dated Feb. 24, 2017 in counterpart International Patent Application No. PCT/KR2016/014153.

*Primary Examiner* — Quynh Nguyen
(74) *Attorney, Agent, or Firm* — Nixon & Vanderhye P.C.

(57) ABSTRACT

Provided is an electronic device including a communicator including communication circuitry configured to perform wireless communication with a peripheral device and to receive information indicating at least one audio connection protocol for connecting the peripheral device to the electronic device; a processor; a memory; and one or more programs comprising instructions, stored in the memory, which, when executed by the processor, cause the processor to perform operations corresponding to the instructions, the one or more programs including instructions for selecting one of the at least one audio connection protocol based on pre-set priorities of the audio connection protocols; and instructions for outputting an audio signal to the peripheral device based on the selected audio connection protocol.

22 Claims, 19 Drawing Sheets

(56) References Cited

U.S. PATENT DOCUMENTS

| | | |
|---|---|---|
| 2011/0269400 A1 | 11/2011 | Kweon et al. |
| 2012/0309309 A1* | 12/2012 | Cho .................... H04W 76/023 455/41.1 |
| 2015/0170427 A1 | 6/2015 | Hansen et al. |
| 2015/0264028 A1* | 9/2015 | Kim ........................ H04L 43/08 726/3 |

* cited by examiner

ELECTRONIC DEVICE AND METHOD OF OPERATING THE SAME

CROSS-REFERENCE TO RELATED APPLICATION

This application is based on and claims priority under 35 U.S.C. § 119 to Korean Patent Application No. 10-2015-0178513, filed on Dec. 14, 2015, in the Korean Intellectual Property Office, the disclosure of which is incorporated by reference herein in its entirety.

BACKGROUND

1. Field

The present disclosure relates generally to an electronic device and a method of operating the same, and for example, to an electronic device that outputs an audio signal to an external audio device and a method of operating the same.

2. Description of Related Art

As the demand for improved sound quality for, for example, a home theater increases, an electronic device for reproducing multimedia content, such as a TV, a Blu-ray disc player, a digital versatile disc (DVD) player, a personal computer (PC), and a video game console, may be connected to an audio device that provides high quality sound to a user and may output high quality audio.

Here, each of an electronic device and an audio device provides a plurality of connection protocols in order to guarantee compatibility between the electronic device and the audio output device. It is necessary for a user to select one of the plurality of connection protocols and configure the electronic device and the audio output device to be connected to each other based on the selected connection protocol.

SUMMARY

An electronic device that automatically provides the best connection protocol based on a current wire/wireless connection state when the electronic device is connected to an external audio device and a method of operating the electronic device are provided.

Additional aspects will be set forth in part in the description which follows and, in part, will be apparent from the description.

According to an aspect of an example embodiment, an electronic device includes a communicator comprising communication circuitry configured to perform wireless communication with at least one peripheral device and to receive information indicating at least one audio connection protocol for connecting the at least one peripheral device to the electronic device; a processor; a memory; and one or more programs, which are stored in the memory and the one or more programs include instructions which, when executed by the processor cause the processor to perform operations corresponding to the instructions, the instructions comprising: instructions for selecting one of the at least one audio connection protocol based on pre-set priorities of the audio connection protocols; and instructions for outputting an audio signal to the at least one peripheral device based on the selected audio connection protocol.

The electronic device may further include a display, wherein the one or more programs may include: instructions for displaying an icon indicating the at least one peripheral device on the display; and instructions for outputting the audio signal to the at least one peripheral device based on the selected audio connection protocol when an input for selecting the icon is detected.

The at least one peripheral device may include a first peripheral device and a second peripheral device, the electronic device may further include a display, and the one or more programs may further include: instructions for displaying a first icon indicating the first peripheral device and a second icon indicating the second peripheral device on the display; instructions for outputting the audio signal to the first peripheral device based on a first audio connection protocol selected with regard to the first peripheral device when an input for selecting the first icon is detected; and instructions for outputting the audio signal to the second peripheral device based on a second audio connection protocol selected with regard to the second peripheral device when an input for selecting the second icon is detected.

The one or more programs may further include: instructions for controlling the communications circuitry of the communicator to perform wireless communication with the at least one peripheral device when power-on of the electronic device is detected.

The communication circuitry of the communicator may receive an audio connection request from the at least one peripheral device, and the one or more programs may further include instructions for selecting one of the at least one audio connection protocol when the audio connection request is received.

The communication circuitry of the communicator may transmit a request for switching an audio input mode to an audio input mode corresponding to the selected audio connection protocol to the at least one peripheral device.

The one or more programs may further include: instructions for switching an audio output mode to an audio output mode corresponding to the selected audio connection protocol.

The priorities of the audio connection protocols may be set in advance based on qualities of audio signals output based on the respective audio connection protocols.

The audio connection protocols may include at least one of at least one wired connection protocol and at least one wireless connection protocol, and the priority of the wired connection protocol may be set to be higher than the priority of the wireless connection protocol.

The wired connection protocol may include at least one of a HDMI connection protocol, an optical connection protocol, and an Aux connection protocol, and priorities of the HDMI connection protocol, the optical connection protocol, and the Aux connection protocol may decrease from high to low in the order of the HDMI connection protocol, the optical connection protocol, and the Aux connection protocol.

The wireless connection protocol may include at least one of a Bluetooth connection protocol and a Wi-Fi connection protocol, and the priority of the Wi-Fi connection protocol may be set to be higher than the priority of the Bluetooth connection protocol.

According to an aspect of another example embodiment, a method of operating an electronic device, the method includes performing wireless communication with at least one peripheral device and receiving information indicating at least one audio connection protocol for connecting the at least one peripheral device to the electronic device; selecting one of the at least one audio connection protocol based on pre-set priorities of audio connection protocols; and outputting an audio signal to the at least one peripheral device based on the selected audio connection protocol.

The method may further include displaying an icon indicating the at least one peripheral device, wherein, when an input for selecting the icon is detected, the audio signal may be output to the at least one peripheral device based on the selected audio connection protocol.

The at least one peripheral device may include a first peripheral device and a second peripheral device. The method may further include displaying a first icon indicating the first peripheral device and a second icon indicating the second peripheral device on the display, and the outputting of the audio signal to the at least one peripheral device may include outputting the audio signal to the first peripheral device based on a first audio connection protocol selected with regard to the first peripheral device when an input for selecting the first icon is detected; and outputting the audio signal to the second peripheral device based on a second audio connection protocol selected with regard to the second peripheral device when an input for selecting the second icon is detected.

The method may further include detecting power-on of the electronic device, wherein, when the electronic device is turned on, wireless communication may be performed with the at least one peripheral device.

The method may further include receiving an audio connection request from the at least one peripheral device, wherein, when the audio connection request is received, one of the at least one audio connection protocol may be selected.

The method may further include transmitting a request for switching an audio input mode to an audio input mode corresponding to the selected audio connection protocol to the at least one peripheral device.

The method may further include switching an audio output mode to an audio output mode corresponding to the selected audio connection protocol.

The priorities of the audio connection protocols may be set in advance based on qualities of audio signals output based on the respective audio connection protocols.

The audio connection protocols may include at least one of at least one wired connection protocol and at least one wireless connection protocol, and the priority of the wired connection protocol may be set to be higher than the priority of the wireless connection protocol.

The wired connection protocol may include at least one of a HDMI connection protocol, an optical connection protocol, and an Aux connection protocol, and priorities of the HDMI connection protocol, the optical connection protocol, and the Aux connection protocol may decrease from high to low in the order of the HDMI connection protocol, the optical connection protocol, and the Aux connection protocol.

The wireless connection protocol may include at least one of a Bluetooth connection protocol and a Wi-Fi connection protocol, and the priority of the Wi-Fi connection protocol may be set to be higher than the priority of the Bluetooth connection protocol.

BRIEF DESCRIPTION OF THE DRAWINGS

These and/or other aspects will become apparent and more readily appreciated from the following detailed description, taken in conjunction with the accompanying drawings in which like reference numerals refer to like elements, and wherein.

DETAILED DESCRIPTION

Figure 1:
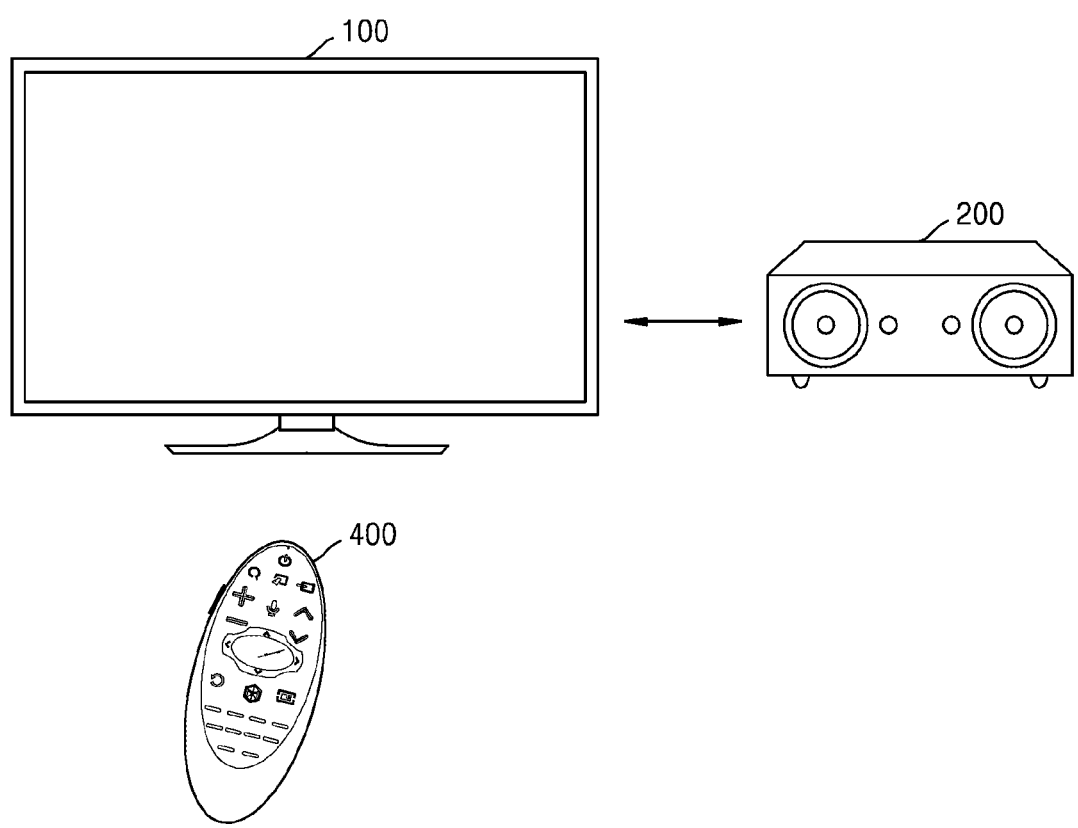
FIG. 1 is a diagram illustrating an example electronic device according to an example embodiment.

Terminologies used in the present description will be briefly described, and then the detailed description of the disclosure will be given.

Although the terms used in the disclosure are selected from generally known and used terms, some of the terms mentioned in the description of the disclosure have been selected by the applicant at his or her discretion, the detailed meanings of which are described in relevant parts of the description herein. Furthermore, it is required that the disclosure is understood, not simply by the actual terms used but by the meaning of each term lying within.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the description may refer, for example, to units for processing at least one function and operation and can be implemented by hardware components (e.g., circuitry) or software components and combinations thereof.

Reference will now be made in greater detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram illustrating an example electronic device 100 according to an example embodiment.

As illustrated in FIG. 1, the electronic device 100 may be a TV. However, it is merely an embodiment, and the electronic device 100 may include any electronic device including a display. For example, the electronic device 100 may include a mobile phone, a tablet personal computer (PC), a digital camera, a camcorder, a laptop computer, a desktop PC, an e-book reader, a digital broadcast device, a personal digital assistant (PDA), a portable multimedia player (PMP), a navigation device, an MP3 player, and a wearable device, or the like. However, the present disclosure is not limited thereto. Particularly, embodiments of the present disclosure may be easily applied to a display device having a large display, such as a TV. However, the present disclosure is not limited thereto.

Furthermore, the electronic device 100 may be a fixed device or a mobile device and may be a digital broadcast receiver capable of receiving a digital broadcast. Furthermore, the electronic device 100 may include not only a flat image display device, but also a curved image display device having a certain curvature or a flexible image display device having a curvature that may be adjusted. Output resolutions of the electronic device 100 may include high definition (HD) resolution, full HD resolution, ultra HD resolution, or a resolution higher than ultra HD resolution.

Furthermore, the electronic device 100 may be a playback device that reproduces multimedia content. For example, the electronic device 100 may include a Blu-ray disc player, a set-top box, a digital versatile disc (DVD) player, etc.

The electronic device 100 may be controlled by a control device 400. The control device 400 may include one of various types of devices for controlling the electronic device 100, such as a remote controller or a mobile phone.

Furthermore, the control device 400 may control the electronic device 100 by using short-distance communication protocols including an infrared ray communication protocol and a Bluetooth protocol. The control device 400 may control functions of the electronic device 100 by using at least one of keys (including buttons), a touch pad, a microphone (not shown) capable of receiving a voice of a user, and a sensor (not shown) capable of recognizing a motion of the control device 400.

The control device 400 includes a power on/off button for turning the electronic device 100 on or off. The control device 400 may also change a channel of the electronic device 100, adjust the volume of the electronic device 100, select a ground wave broadcast, a cable broadcast, or a satellite broadcast, or configure a setting.

In addition, the electronic device 100 may process audio data. The electronic device 100 may perform various audio processing operations including decoding, amplification, and noise filtering on audio data.

Furthermore, the electronic device 100 may output a processed audio signal to a peripheral device 200.

The peripheral device 200 according to an embodiment may be an audio device having an audio input function and an audio output function. For example, the audio device 200 may include one of various electronic devices including one of various speaker devices (e.g., a sound bar, a Bluetooth speaker, a network speaker, a surround speaker, etc.), a smart phone, a mobile phone dock, a tablet personal computer (PC), a mobile phone, a video phone, an e-book reader, a desktop PC, a laptop PC, a netbook computer, a PDA, a PMP, an MP3 player, and a wearable device.

The electronic device 100 may perform wireless communication with the peripheral device 200 and search for the peripheral device 200. Here, wireless communication protocols may include a Bluetooth Low Energy (BLE) protocol, an Ethernet protocol, a Wi-Fi protocol, a Bluetooth protocol, etc. The electronic device 100 may receive information regarding at least one audio connection protocol to be connected to the electronic device 100 from the peripheral device 200.

The electronic device 100 may select one of at least one audio connection protocol based on pre-set priorities of audio connection protocols. The electronic device 100 may output an audio signal processed by the electronic device 100 to the peripheral device 200 based on the selected audio connection protocol.

In embodiments of the present disclosure, the term "user" refers to a person who controls functions or operations of the electronic device 100 by using the control device 400 and may include a viewer, an administrator, or an installation technician.

Figure 2:
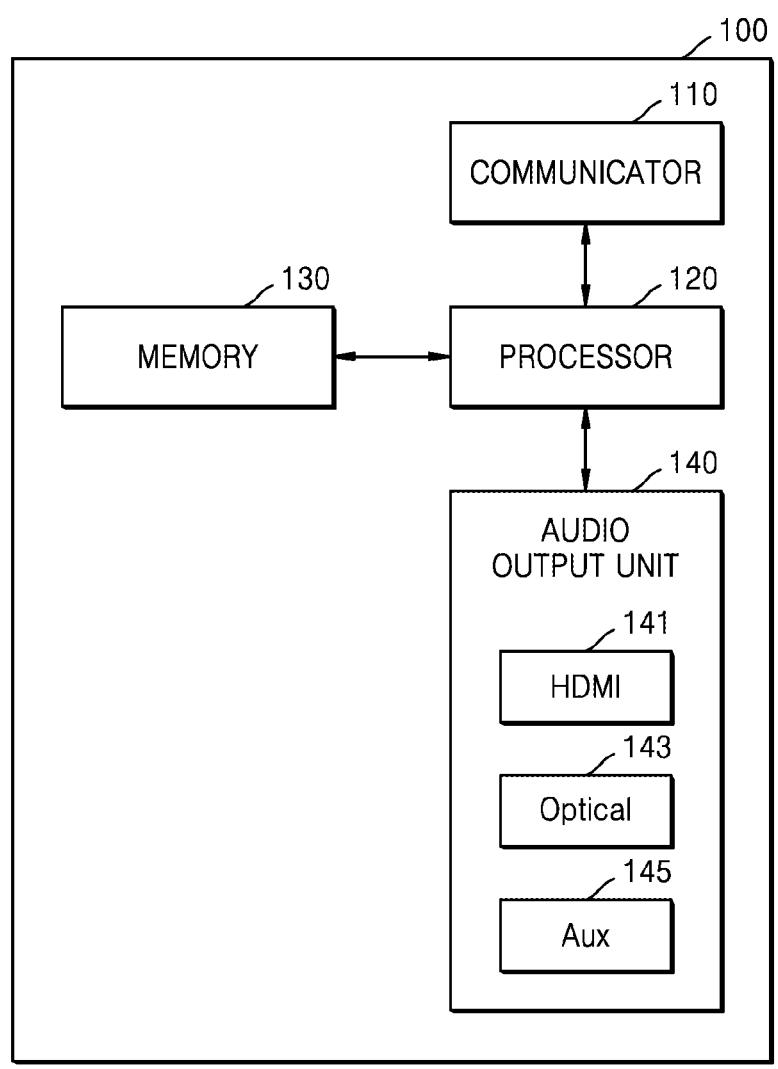
FIG. 2 is a block diagram illustrating an example configuration of an electronic device according to an example embodiment.

FIG. 2 is a block diagram illustrating an example configuration of an electronic device according to an example embodiment.

Referring to FIG. 2, an electronic device 100 according to an embodiment may include a communicator (e.g., including communication circuitry) 110, a processor 120, a memory 130, and an audio output unit (e.g., including audio output circuitry) 140.

The communicator 110 may include various communication circuitry configured to connect the electronic device 100 to an external device (e.g., an audio device) under the control of the display 120. The processor 120 may transmit/receive content to/from an external device connected thereto, download an application from the external device, or browse web pages, via the communication circuitry of the communicator 110. Based on the performance and structure of the electronic device 300, the communicator 110 may include various communication circuitry, such as, for example, and without limitation, one of a wireless LAN module, a Bluetooth module, and a wire Ethernet module. Furthermore, the communicator 110 may include a combination of communication circuitry, such as, for example, and without limitation, a wireless LAN module, a Bluetooth module, and a wire Ethernet module. The communication circuitry of the communicator 110 may receive a control signal of the control device 400 under the control of the controller 310. A control signal may include a Bluetooth signal, an RF signal, or a Wi-Fi signal.

The communicator 110 may include various communication circuitry, such as, for example, and without limitation, short-range wireless communication modules, other than the Bluetooth module, e.g., a near field communication (NFC) module (not shown), a BLE module, etc.

The communicator 110 may include various communication circuitry configured to perform wireless communication with a peripheral device and search for the peripheral device. Furthermore, the communicator 110 may receive information regarding at least one audio connection protocol to be connected to the electronic device 100 from the peripheral device.

Furthermore, the communicator 110 may include various communication circuitry configured to transmit an audio signal processed by the electronic device 100 to a peripheral device (e.g., an audio device) via a wireless connection protocol. Here, the wireless connection protocol may include at least one of a Wi-Fi connection protocol and a Bluetooth connection protocol, but is not limited thereto.

Furthermore, the communicator 110 may include various communication circuitry configured to transmit a request to switch to an audio input mode corresponding to a selected audio connection protocol to a peripheral device.

The processor 120 may execute one or more programs stored in the memory 130. The processor 120 may include a single core, dual cores, triple cores, quad cores, and cores in multiples of 4. Furthermore, the processor 120 may include a plurality of processors. For example, the processor 120 may include a main processor (not shown) and a sub processor (not shown) that operates in a sleep mode.

The memory 130 may store various data, programs, or applications for operating and controlling the electronic device 100. A program stored in the memory 130 may include one or more instructions. A program (one or more instructions) or an application stored in the memory 130 may be executed by the processor 120.

The processor 120 may execute instructions on a peripheral device, the instructions for selecting one of at least one audio connection protocol to be connected to the electronic device 100 based on pre-set priorities of audio connection protocols.

Here, priorities of audio connection protocols may be pre-set based on sound quality of audio signals output based on the respective audio connection protocols. For example, audio connection protocols may include at least one of at least one wire connection protocol and at least one wireless connection protocol, where the priority of the wire connection protocol may be higher than the priority of the wireless connection protocol. Furthermore, the wire connection protocol may include at least one of a HDMI connection protocol, an optical connection protocol, and an Aux connection protocol, where priorities thereof may decrease from high to low in the order of the HDMI connection protocol, the optical connection protocol, and the Aux connection protocol. Furthermore, the wireless connection protocol may include at least one of a Bluetooth connection protocol and a Wi-Fi connection protocol, where the priority of the Wi-Fi connection protocol may be higher than the priority of the Bluetooth connection protocol. However, the present disclosure is not limited thereto.

Furthermore, the processor 120 may execute instructions for processing an audio signal. For example, the processor 120 may execute instructions for performing various audio processing operations including decoding, amplification, and noise filtering on audio data. Furthermore, the processor 120 may include instructions for outputting an audio signal to a peripheral device based on a selected audio connection protocol.

The audio output unit 140 may include various circuitry that outputs an audio signal processed by the electronic device 100 under the control of the processor 120. The audio output unit 140 may include various circuitry that includes at least one audio output port. The audio output port may include at least one of a high-definition multimedia interface (HDMI) port 141, an optical jack 143, and an Aux jack 145. However, the present disclosure is not limited thereto.

Figure 3:
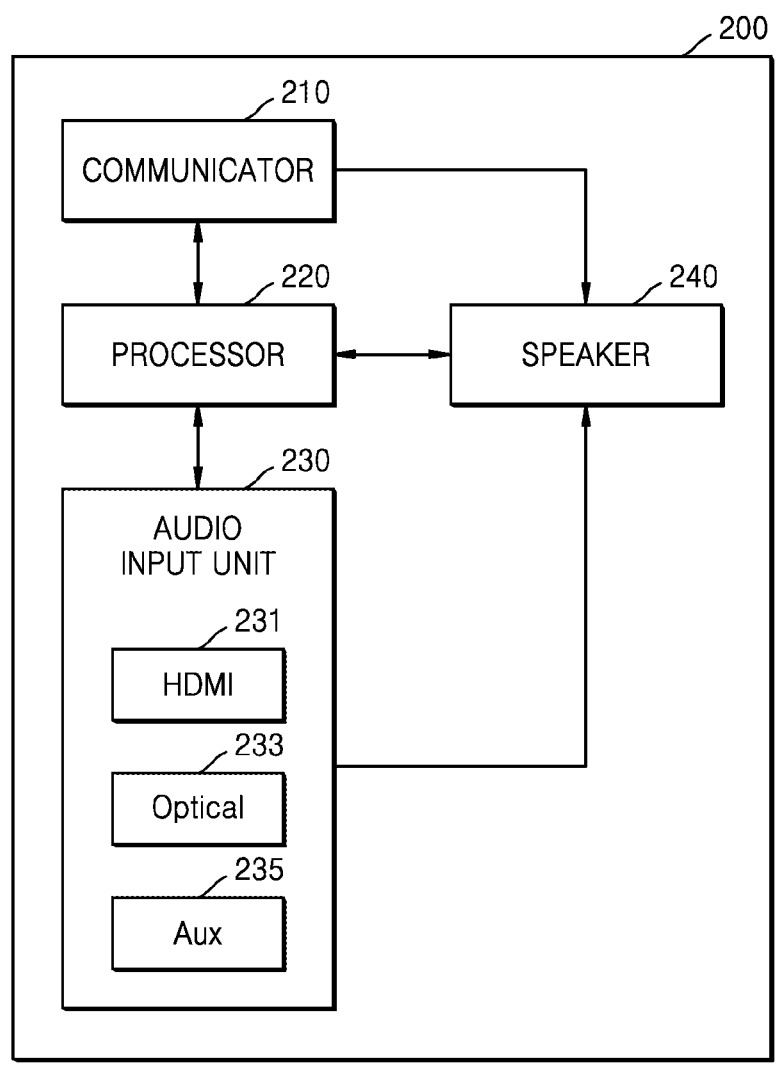
FIG. 3 is a block diagram illustrating an example configuration of a peripheral device according to an example embodiment.

FIG. 3 is a block diagram illustrating an example peripheral device according to an example embodiment. The peripheral device of FIG. 3 may be an example embodiment of the peripheral device 200 of FIG. 1 and may be an audio device.

Referring to FIG. 3, the peripheral device 200 may include a communicator (e.g., including communication circuitry) 210, a processor 220, an audio input unit (e.g., including audio input circuitry) 230, and a speaker 240.

The communicator 210 may include various communication circuitry configured to connect the peripheral device 200 to an external device (e.g., an electronic device) under the control of the processor 220. Based on the performance and structure of the peripheral device 200, the communicator 210 may include various communication circuitry, such as, for example, and without limitation, one of a wireless LAN module, a Bluetooth module, and a wire Ethernet module. Furthermore, the communicator 210 may include a combination of communication circuitry, such as, for example, and without limitation, a wireless LAN module, a Bluetooth module, and a wire Ethernet module.

The communicator 210 may include various communication circuitry configured to perform wireless communication with an external device (e.g., an electronic device) and search for the external device. Furthermore, the communication circuitry of the communicator 210 may transmit information indicating at least one audio connection protocol for connecting the peripheral device 200 to an external device to the external device.

Furthermore, the communicator 210 may receive an audio signal processed by an external device via a wireless connection protocol. Here, the wireless connection protocol may include at least one of a Wi-Fi connection protocol and a Bluetooth connection protocol, but is not limited thereto.

The communicator 210 may receive a request to switch to an audio input mode from an external device.

In correspondence to the request to switch to an audio input mode, the processor 220 may control the audio input unit 230 to switch an audio input mode and receive an audio signal in the switched audio input mode from the external device.

The audio input unit 230 may include various audio input circuitry that receives an audio signal processed by the electronic device 100. The audio input unit 230 may include at least one audio input port. The audio input port may include at least one of a high-definition multimedia interface (HDMI) port 231, an optical jack 233, and an Aux jack 235. However, the present disclosure is not limited thereto.

The speaker 240 may output an audio signal received by the communicator 210 or an audio signal input by the audio input unit 230.

Figure 4:
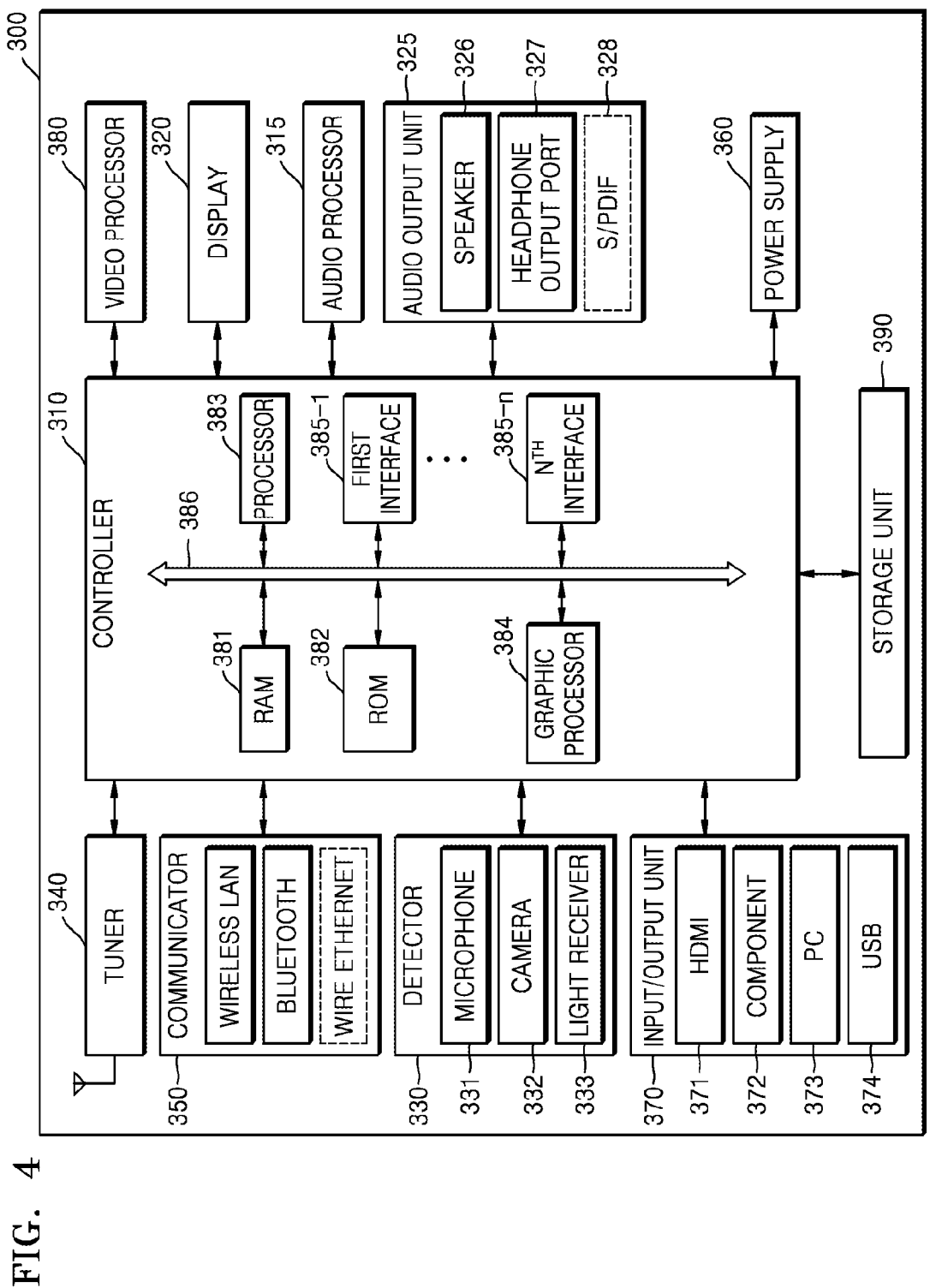
FIG. 4 is a block diagram illustrating an example configuration of an electronic device according to another example embodiment.

FIG. 4 is a block diagram illustrating an example configuration of an electronic device according to another example embodiment. An electronic device 300 of FIG. 4 may be an embodiment of the electronic device 100 of FIG. 1.

Referring to FIG. 4, the electronic device 300 may include a controller 310, a display 320, a detector (e.g., including detector circuitry) 330, a video processor 380, an audio processor 315, an audio output unit (e.g., including audio output circuitry) 325, a power supply 360, a tuner 340, a communicator (e.g., including communication circuitry) 350, an input/output unit (e.g., including input/output circuitry) 370, and a storage unit 390.

The communicator 110 of FIG. 2 may correspond to the communicator 350 of FIG. 4, the processor 120 of FIG. 2 may correspond to the controller 310 of FIG. 4, the memory 130 of FIG. 2 may correspond to the storage unit 390 of FIG. 4, and the audio output unit 140 of FIG. 2 may correspond to the audio output unit 325 and the input/output unit 370 of FIG. 4. Descriptions identical or similar to those given above with reference to FIG. 2 may be omitted below.

The video processor 380 processes video data received by the electronic device 300. The video processor 380 may perform various image processing operations on video data, such as decoding, scaling, noise filtering, frame rate conversion, and resolution conversion.

The display 320 transforms an image signal, a data signal, an OSD signal, and a control signal and generates a driving signal. The display 320 may include a plasma display panel (PDP), a liquid crystal display (LCD), an organic light-emitting diode (OLED) display, a flexible display, or a 3-dimensional (3D) display. Furthermore, the display 320 may be configured as a touch screen and may be used not only as an output device, but also as an input device.

The display 320 displays a video included in a broadcasting signal received via the tuner 340 under the control of the controller 310. Furthermore, the display 320 may display content (e.g., moving pictures) input via the communicator 350 or the input/output unit 370. The display 320 may output an image stored in the storage unit 390 under the control of the display 320. Furthermore, the display 320 may display a voice user interface (UI) (e.g., a UI including a voice command guide) for performing a voice recognition task or a motion UI (e.g., a UI including a user motion guide for motion recognition) for performing a motion recognition task.

The audio processor 315 processes audio data. The audio processor 315 may perform various audio processing operations including decoding, amplification, and noise filtering on audio data. In addition, the audio processor 315 may include a plurality of audio processing modules for processing audio data corresponding to contents.

The audio output unit 325 includes various audio output circuitry that outputs audio included in a broadcasting signal received via the tuner 340 under the control of the controller 310. Furthermore, the audio output unit 325 may output audio (e.g., a voice, a sound) input via the communicator 350 or the input/output unit 370. Furthermore, the audio output unit 325 may output audio stored in the storage unit 390 under the control of the controller 310. The audio output unit 325 may include at least one of a speaker 326, a headphone output port 327, and a Sony/Philips digital interface (S/PDIF) output port 328. The audio output unit 325 may include a combination of the speaker 326, the headphone output port 327, and the S/PDIF output port 328.

The power supply 360 supplies power input from an external power source to internal components of the electronic device 300 under the control of the controller 310. Furthermore, the detector 330 may supply power output by one, two, or more batteries (not shown) arranged in the electronic device 300 to the internal components of the electronic device 300 under the control of the controller 310.

The tuner 340 may tune and select frequency corresponding to a channel to be received by the electronic device 300 from among a large number of frequency components in a broadcasting signal that is received via a wire or wirelessly by amplifying, mixing, and resonating the broadcasting signal. Here, a broadcasting signal includes an audio data signal, a video signal, and additional information (e.g., an electronic program guide (EPG)).

The tuner 340 may receive a broadcasting signal in a frequency band corresponding to a channel number (e.g., a cable broadcast No. 506) based on a user input (e.g., a control signal received from the control device 400, such as a channel number input, a channel up-down input, and a channel input on an EPG screen image).

The tuner 340 may receive a broadcasting signal from various sources, such as a ground wave broadcasting service, a cable broadcasting service, a satellite broadcasting service, and an internet broadcasting service. The tuner 340 may receive a broadcasting signal from sources like an analog broadcasting service or a digital broadcasting service. A broadcasting signal received by the tuner 340 is decoded (e.g., audio decoding, video decoding, or additional information decoding) and is split into an audio signal, a video signal, and/or additional information. The audio signal, the video signal, and/or the additional information obtained from the broadcasting signal may be stored in the storage unit 390 under the control of the controller 310.

The electronic device 300 may include one tuner 340 or a plurality of tuners 340. The tuner 340 may be integrated with the electronic device 300, may include an independent device (e.g., a set-top box (not shown)) having a tuner electrically connected to the electronic device 300, or may include a tuner (not shown) connected to the input/output unit 370.

The detector 330 may include various detector circuitry that detects a voice of a user, an image of the user, or an interaction of the user.

A microphone 331 receives a voice of a user. The microphone 331 may transform a received voice into an electric signal and output the electric signal to the controller 310. The microphone 331 may be integrated with the electronic device 300 or may include an independent device. The independent microphone 331 may be electrically connected to the electronic device 300 via the communicator 350 or the input/output unit 370. It would be apparent to one of ordinary skill in the art that the microphone 331 may be omitted according to the performance and structure of the electronic device 300.

The camera 332 receives an image (e.g., successive frames) corresponding to a user's motion including a gesture within a recognition range of the camera 332. A user's motion may include a motion of a body part of the user, e.g., a face, a face expression, a hand, a fist, a finger, etc. The camera 332 may transform a received image into an electric signal and output the electric signal to the controller 310, under the control of the controller 310. The camera 332 may transform a motion (gesture) corresponding into a power-off input regarding the electronic device 300 to an electric signal and output the electric signal to the controller 310.

The controller 310 may select a menu displayed on the electronic device 300 by using a result of recognizing a received motion or perform a task corresponding to the result of the motion recognition, e.g., power on/off, changing channel, adjusting volume, moving a cursor, etc.

The camera 332 may include a lens (not shown) and an image sensor (not shown). The camera 332 may provide optical zoom or digital zoom by using a plurality of lenses and image processing techniques. The recognition range of the camera 332 may vary according to angles of the camera 332 and surrounding environmental conditions. When the camera 332 includes a plurality of cameras, a 3-dimensional (3D) still image or a 3D motion may be received by using the plurality of cameras.

The camera 332 may be integrated with the electronic device 300 or may include an independent device. An independent device (not shown) including the camera 332 may be electrically connected to the electronic device 300 via the communicator 350 or the input/output unit 370.

It would be apparent to one of ordinary skill in the art that the camera 332 may be omitted according to the performance and structure of the electronic device 300.

The light receiver 333 receives an optical signal (including a control signal) from the external control device 400 via an optical window (not shown) of the bezel of the display 320. The light receiver 333 may receive an optical signal corresponding to a user input (e.g., a touch, a press, a touch gesture, a voice, or a motion) from the control device 400. A control signal may be extracted from the received optical signal under the control of the controller 310.

The input/output unit 370 may include various input/output circuitry that receives a video (e.g., moving pictures, etc.), audio (e.g., voice, music, etc.), and additional information (e.g., an EPG, etc.) from outside of the electronic device 300 under the control of the controller 310. The input/output unit 370 may include various input output circuitry including, for example, and without limitation, at least one of a high-definition multimedia interface port 371, a component jack 372, a PC port 373, and a USB port 374. The input/output unit 370 may include a combination of the HDMI port 371, the component jack 372, the PC port 373, and the USB port 374.

It would be apparent to one of ordinary skill in the art that configurations and operations of the input/output unit 370 may vary according to embodiments of the present disclosure.

The controller 310 controls all operations of the electronic device 300, controls signal flow between internal components of the electronic device 300, and processes data. When a user input is applied to the controller 310 or a certain condition is satisfied, the controller 310 may execute an operating system (OS) and various applications stored in the storage unit 390.

The controller 310 may process an image signal and input the processed image signal to the display 320. Therefore, an image corresponding to the corresponding image signal may be displayed on the display 320. Furthermore, the controller 310 may control the electronic device 300 based on a user command detected by the detector 330 or an internal program.

The controller 310 may include RAM 381 that stores a signal or data received from outside of the electronic device 300 or is used as a storage area corresponding to various tasks performed by the electronic device 300, ROM 382 having stored therein control programs for controlling the electronic device 300, and a processor 383.

The processor 383 may include a graphics processing unit (GPU) (not shown) for processing graphics data corresponding to a video. The processor 383 may include a system-on-chip (SoC) having integrated thereon a core (not shown) and a GPU (not shown).

A graphics processor 384 generates a screen image including various objects, such as icons, images, and texts, by using a processor (not shown) and a renderer (not shown). The processor calculates property values, such as coordinate values, shapes, sizes, and colors, for displaying respective objects according to a layout of a screen image by using a user input detected by the detector 330. The renderer generates screen images having various layouts including objects based on property values calculated by the processor. A screen image generated by the renderer is displayed within a display area of the display 320.

First through nth interfaces 385-1 through 385-n are connected to the above-stated components. One of the first through nth interfaces 385-1 through 385-n may be a network interface that is connected to an external device via a network.

The RAM 381, the ROM 382, the processor 383, the graphics processor 384, and the first through nth interfaces 385-1 through 385-n may be connected to one another via an internal bus 386.

In the present embodiment, the term 'control unit of an electronic device' may include the processor 383, the ROM 382, and the RAM 381.

The storage unit 390 may store various data, programs, or applications for operating and controlling the electronic device 300 under the control of the controller 310. The storage unit 390 may store signals or data input/output in correspondence to operations of the video processor 380, the display 320, the audio processor 315, the audio output unit 325, the detector 330, the tuner 340, the communicator 350, the detector 330, and the input/output unit 370. The storage unit 390 may store control programs for controlling the electronic device 300 and the controller 310, applications initially provided by a manufacturer of the electronic device 300 or downloaded from outside, graphical user interfaces (GUIs) related to the applications, objects (e.g., images, texts, icons, buttons, etc.) for providing the GUIs, user information, documents, databases, or data related thereto.

According to an embodiment, the term "storage unit" includes the storage unit 390, the ROM 382 and the RAM 381 of the controller 310, and/or a memory card (not shown) attached to the electronic device 300 (e.g., a micro SD card, a USB memory, etc.). Furthermore, the storage unit 390 may include a non-volatile memory, a volatile memory, a hard disk drive (HDD), or a solid state drive (SSD).

Although not shown, the storage unit 390 may include a broadcast receiving module, a channel control module, a volume control module, a communication control module, a voice recognition module, a motion recognition module, an optical receiving module, a display control module, an audio control module, an external input control module, a power control module, a module for controlling a wirelessly connected external device (e.g., connected via a Bluetooth connection), a voice database (DB), or a motion DB. The modules (not shown) and the DB (not shown) of the storage unit 390 may be embodied in the form of software for controlling the electronic device 300 to perform a broadcast reception control function, a channel control function, a volume control function, a communication control function, a voice recognition function, a motion recognition function, an optical signal reception control function, a display control function, an audio control function, an external input control function, a power control function, or a function for controlling a wirelessly connected external device (e.g., connected via a Bluetooth connection). The controller 310 may perform the above-stated functions by using the software modules stored in the storage unit 390.

Furthermore, the electronic device 300 including the display 320 may be electrically connected to an independent external device including the tuner 140 (e.g., a set-top box) (not shown). For example, the electronic device 300 may include an analog TV, a digital TV, a 3D TV, a smart TV, a LED TV, an OLED TV, a plasma TV, or a monitor. However, it would be apparent to one of ordinary skill in the art that the disclosure is not limited thereto.

The electronic device 300 may include a sensor (not shown) for detecting a condition inside or outside the electronic device 300 (e.g., an illuminance sensor, a temperature sensor, etc.).

The electronic devices 100 and 300 illustrated in FIGS. 2 and 4 are merely embodiments. The components illustrated in FIGS. 2 and 4 may be integrated with one another, additional components may be introduced, or some of the components illustrated in FIGS. 2 and 3 may be omitted according to specifications of the electronic devices 100 and 300. In other words, as occasion demands, two or more components may be integrated as a single component or a single component may be split into two or more components. Furthermore, functions performed by respective blocks are merely for describing embodiments, and operations and devices related thereto do not limit the disclosure.

Figure 5:
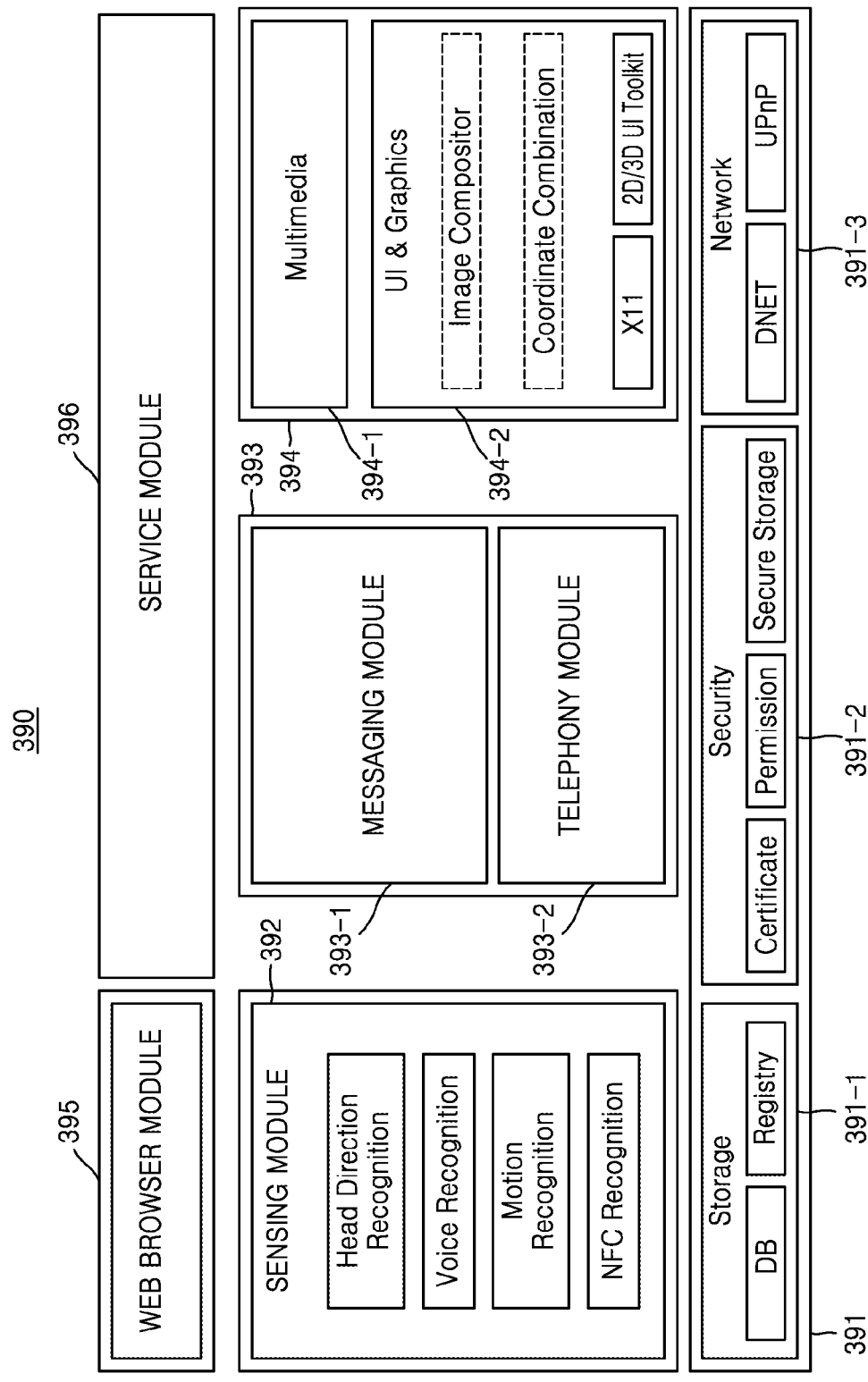
FIG. 5 is a diagram illustrating an example configuration of software stored in the storage unit of FIG. 4.

FIG. 5 is a diagram illustrating an example configuration of software stored in the storage unit 390 of FIG. 4.

Referring to FIG. 5, software including a base module 391, a sensing module 392, a communication module 393, a presentation module 394, a web browser module 395, and a service module 396 may be stored in the storage unit 390.

The base module 391 refers to a basic model that processes signals transmitted from respective hardware modules included in the electronic device 300 and transmits the processed signals to upper layer modules. The base module 391 includes a storage module 391-1, a security module 391-2, and a network module 391-3. The storage module 391-1 is a program module that manages a database DB or a registry. The processor 383 may use the storage module 391-1 to access a database in the storage unit 390 and to read out various data. The security module 391-2 is a program module that supports hardware certification, permission, and secure storage. Furthermore, the network module 391-3 is a module that supports a network connection and includes a DNET module, a UPnP module, etc.

The sensing module 392 is a module that collects information from various sensors and analyzes and manages collected information. The sensing module 392 may include, for example, and without limitation, a head direction recognizing module, a face recognizing module, a voice recognizing module, a motion recognizing module, a NFC recognizing module, etc.

The communication module 393 is a module for performing a communication with an external device. The communication module 393 may include a messaging module 393-1, such as a messenger program, a short message service (SMS) & multimedia message service (MMS) program, and an e-mail program, and a telephony module 393-2 including a call info aggregator module, a VoIP module, etc.

The presentation module 394 is a module for configuring a display screen image. The presentation module 394 includes a multimedia module 394-1 for reproducing and outputting multimedia content and a UI rendering module 394-2 that processes UIs and graphics. The multimedia module 394-1 may include a player module, a camcorder module, and a sound processing module. Therefore, the multimedia module 394-1 performs operations for reproducing various multimedia content and generating and playing back screen images and sounds. The UI rendering module 394-2 may include an image compositor module that combines images, a coordinate combining module that combines and generates coordinates for displaying an image on a screen image, an X11 module that receives various events from hardware modules, and a 2D/3D UI toolkit that provides tools for configuring 2D or 3D UIs.

The web browser module 395 refers to a module that browses web and accesses web servers. The web browser module 395 may include various modules, such as a web view module that configures a web page, a download agent module that performs download tasks, a bookmark module, and a webkit module.

The service module 396 is a module including various applications for providing various services. In detail, the service module 396 may include various program modules, such as a SNS program, a content playback program, a game program, an e-book program, a calendar program, an alarm management program, and various other widgets.

Although FIG. 5 illustrates various program modules, some of the program modules may be omitted, some of the program modules may be modified, or some additional program modules may be added based on types and characteristics of the electronic device 300. For example, the electronic device 300 may further include a location-based module that provides a location-based service in conjunction with a hardware component like a global positioning system (GPS) chip.

Figure 6:
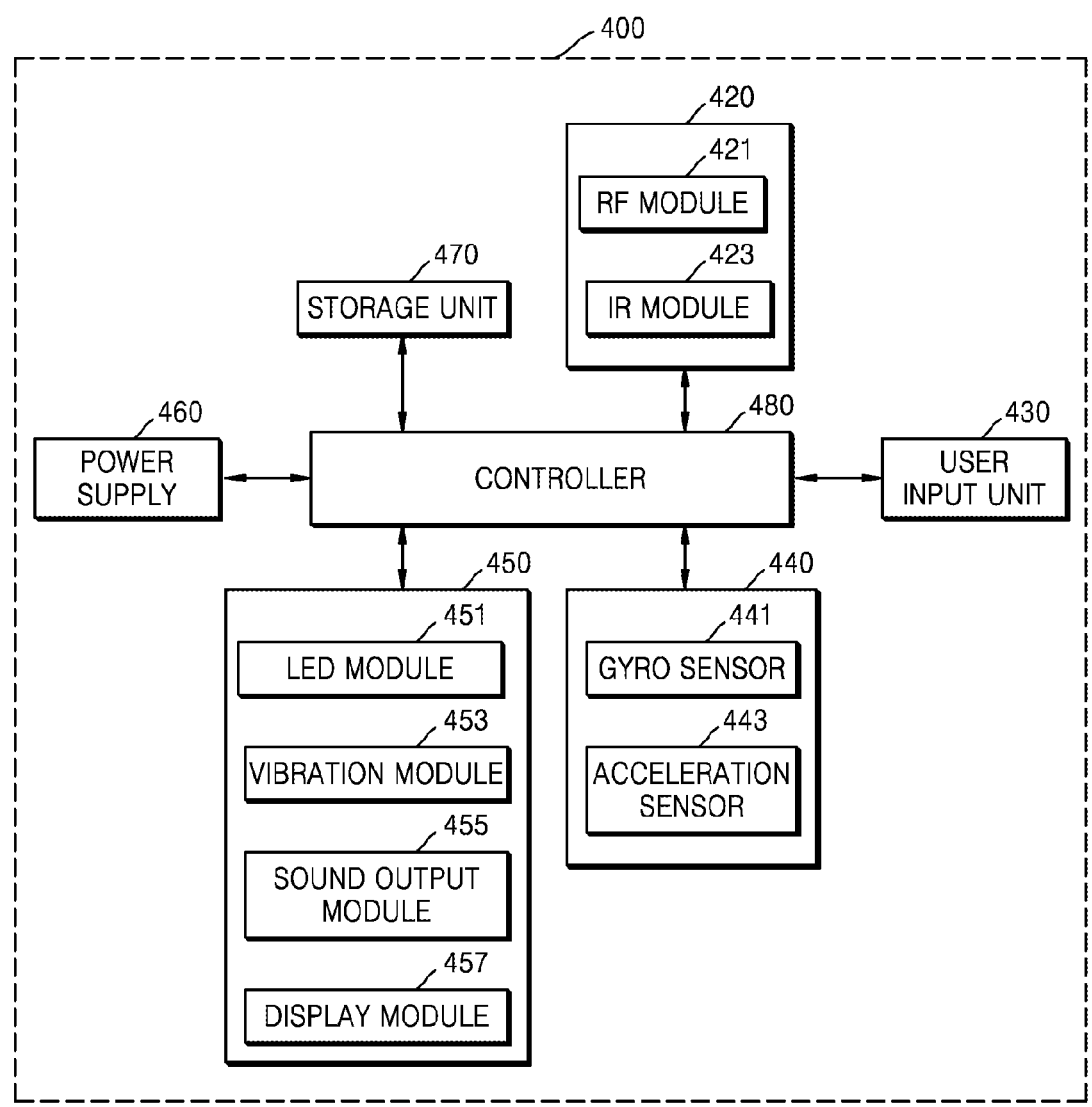
FIG. 6 is a block diagram illustrating an example configuration of a control device according to an example embodiment.

FIG. 6 is a block diagram illustrating an example configuration of a control device according to an example embodiment.

Referring to FIG. 6, the control device 400 may include a wireless communicator (e.g., including wireless communication circuitry) 420, a user input unit (e.g., including input circuitry) 430, a sensor 440, an output unit (e.g., including output circuitry) 450, a power supply 460, a storage unit 470, and a controller 480.

The wireless communicator 420 may include various wireless communication circuitry configured to exchange a signal with an arbitrary one of electronic devices according to above-stated embodiments. The wireless communicator 420 may include various communication circuitry, such as, for example, and without limitation, an RF module 421 for exchanging a signal with the electronic devices 100 and 300 according to RF communication protocol. Furthermore, the control device 400 may include additional wireless communication circuitry, such as, for example, and without limitation, an IR module 423 for exchanging a signal with the electronic devices 100 and 300 according to IR communication protocol.

According to the present embodiment, the control device 400 transmits a signal including information regarding a motion of the control device 400 to the electronic devices 100 and 300 via the RF module 421.

Furthermore, the control device 400 may receive a signal transmitted by the electronic devices 100 and 300 via the RF module 421. Furthermore, if necessary, the control device 400 may transmit a command for power on/off, changing channel, or changing volume to the electronic devices 100 and 300 via the IR module 423.

The user input unit 430 may include various input circuitry, such as, for example, and without limitation, a keypad, buttons, a touch pad, or a touch screen. A user may input a command related to the electronic devices 100 and 300 to the control device 400 by manipulating the user input unit 430. When the user input unit 430 includes hard key buttons, a user may input a command related to the electronic devices 100 and 300 to the control device 400 by pushing the hard key buttons. When the user input unit 430 includes a touch screen, a user may input a command related to the electronic devices 100 and 300 to the control device 400 by toughing soft keys on the touch screen.

The sensor 440 may include a gyro sensor 441 or an acceleration sensor 443. The gyro sensor 441 may detect information regarding a motion of the control device 400. For example, the gyro sensor 441 may detect information regarding a motion of the control device 400 based on x, y, and z axes. The acceleration sensor 443 may detect information regarding a moving speed of the control device 400. Furthermore, the sensor 440 may further include a distance detecting sensor for detecting distances from the control device 400 to the electronic devices 100 and 300.

The output unit 450 may include various output circuitry configured to output an image signal or a voice signal corresponding to a user's manipulation of the user input unit 430 or a signal received by the electronic devices 100 and 300. A user may recognize whether the user manipulated the user input unit 430 or controlled the electronic devices 100 and 300, via the output unit 450.

For example, the output unit 450 may include various output circuitry, such as, for example, and without limitation, an LED module that emits light, a vibration module that generates vibration, a sound output module that outputs a sound, or a display module that displays an image when the user input unit 430 is manipulated or a signal is transmitted to or received from the electronic devices 100 and 300 via the wireless communicator 420.

The power supply 460 supplies power to the control device 400. When the control device 400 is not moved for a certain time period, the power supply 460 may reduce power consumption by stopping power supply. When a certain key included in the control device 400 is manipulated, the power supply 460 may resume power supply.

Various programs and application data for controlling or operating the control device 400 may be stored in the storage unit 470.

The controller 480 controls overall operations for controlling the control device 400. The controller 480 may transmit a signal corresponding to manipulation of a certain key of the user input unit 430 or a signal corresponding to a motion of the control device 400 detected by the sensor 440 to the electronic devices 100 and 300 via the wireless communicator 420.

Each of the electronic devices 100 and 300 may include a coordinate calculator (not shown) for calculating coordinates of a cursor corresponding to a motion of the control device 400.

The coordinate calculator (not shown) may calculate coordinates (x, y) of a cursor to be displayed on the display 320 by correcting hand shake or errors from signals corresponding to a detected motion of the control device 400.

Furthermore, a signal transmitted from the control device 400 and detected by the detector 330 is transmitted to the controller 310 of the electronic devices 100 and 300. The controller 310 may determine information regarding a motion of the control device 400 and information regarding manipulation of a key from the signal transmitted by the control device 400 and may control the electronic devices 100 and 300 based on the information.

In another example, the control device 400 may calculate coordinates of a cursor corresponding to the motion and transmit the coordinates to the electronic devices 100 and 300. In this case, the electronic devices 100 and 300 may transmit the received information regarding the coordinates of the cursor to the controller 310 without correcting handshake or an error.

Figure 7:
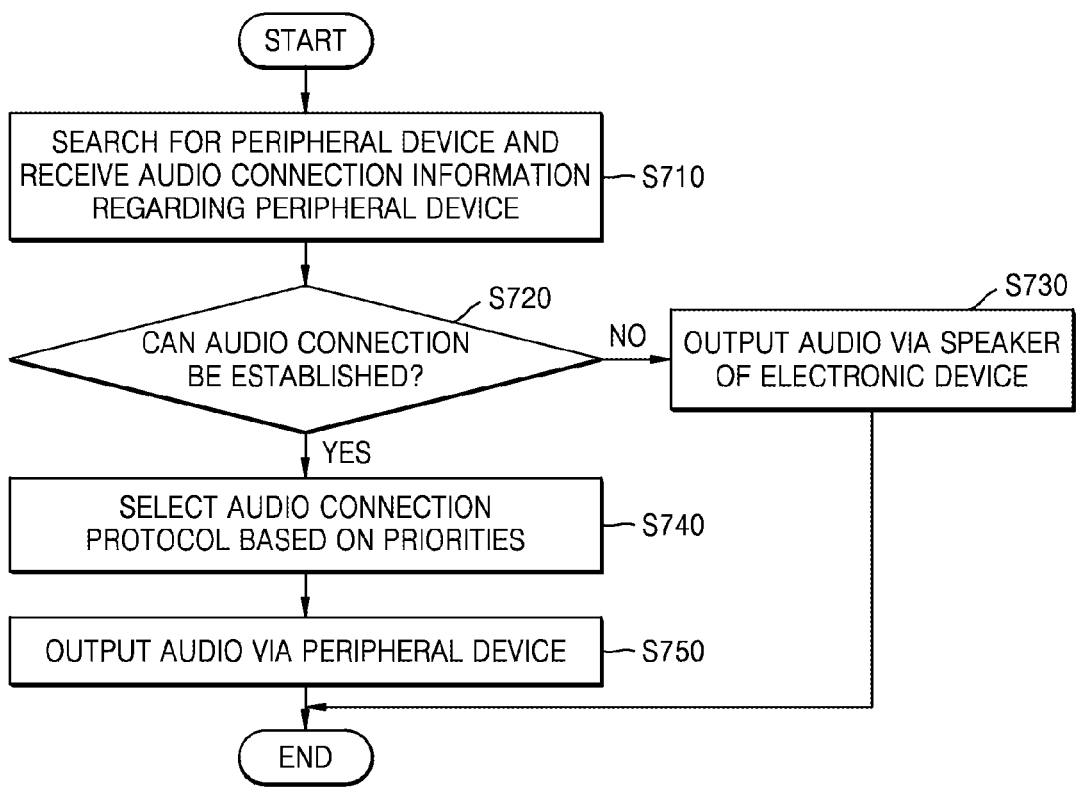
FIG. 7 is a flowchart illustrating an example method of operating an electronic device according to an example embodiment.

FIG. 7 is a flowchart illustrating an example method of operating an electronic device according to an example embodiment.

Referring to FIG. 7, the electronic device 100 may search for a peripheral device and receive audio connection information regarding the peripheral device (operation S710).

For example, when the electronic device 100 detects that the electronic device 100 is turned on, the electronic device 100 may perform wireless communication and search for a peripheral device. A peripheral device according to an embodiment may be an audio device. When a peripheral device is found, the electronic device 100 may receive audio connection information from the found peripheral device. The audio connection information may include information regarding an audio connection protocol supported by the peripheral device (e.g., information indicating that the peripheral device supports a Bluetooth communication protocol and an Aux communication protocol), information regarding connection state of a cable corresponding to a wire connection protocol from among supported audio connection protocols (e.g., information regarding whether an Aux cable is connected between the peripheral device and the electronic device 100), and information regarding audio connection protocols for connecting the peripheral device to the electronic device 100 (e.g., information indicating that, when an Aux cable is connected between the peripheral device and the electronic device 100, the peripheral device and the electronic device 100 may be connected to each other via a Bluetooth connection protocol and Aux connection protocol). However, the present disclosure is not limited thereto.

The electronic device 100 determines whether there is a peripheral device for audio connection, e.g., whether an audio connection can be established (operation S720) and, when no peripheral device for audio connection exists, the electronic device 100 outputs an audio signal using a speaker of the electronic device 100 (operation S730).

For example, a case where no peripheral device for audio connection exists may be a case where no peripheral device is found, a case where, although a peripheral device is found, the peripheral device does not support an audio connection protocol, or a case where a found peripheral device only supports a wire connection protocol and a corresponding cable is not connected between the peripheral device and the electronic device 100. However, the present disclosure is not limited thereto.

Meanwhile, when a peripheral device for audio connection exists, the electronic device 100 may select one of audio connection protocols supported by the peripheral device according to priorities of the audio connection protocols (operation S740).

Here, the priorities of the audio connection protocols may be pre-set based on sound quality of audio signals output based on the respective audio connection protocols. For example, audio connection protocols may include at least one of at least one wire connection protocol and at least one wireless connection protocol, where the priority of the wire connection protocol may be higher than the priority of the wireless connection protocol. Furthermore, the wire connection protocol may include at least one of a HDMI connection protocol, an optical connection protocol, and an Aux connection protocol, where priorities thereof may decrease from high to low in the order of the HDMI connection protocol, the optical connection protocol, and the Aux connection protocol. Furthermore, the wireless connection protocol may include at least one of a Bluetooth connection protocol and a Wi-Fi connection protocol, where the priority of the Wi-Fi connection protocol may be higher than the priority of the Bluetooth connection protocol. However, the present disclosure is not limited thereto.

For example, available audio connection protocols for connecting the peripheral device to the electronic device 100 include a HDMI connection protocol, a Bluetooth connection protocol, and a Wi-Fi connection protocol, the electronic device 100 may select the HDMI connection protocol.

The electronic device 100 may output an audio signal to the peripheral device based on the selected audio connection protocol (operation S750).

For example, when the selected audio connection protocol is the HDMI connection protocol, the electronic device 100 may request the peripheral device to switch an audio input mode to a HDMI input mode and switch an audio output mode of the electronic device 100 to a HDMI output mode. The electronic device 100 may output an audio signal to the peripheral device via a HDMI connection.

Figure 8:
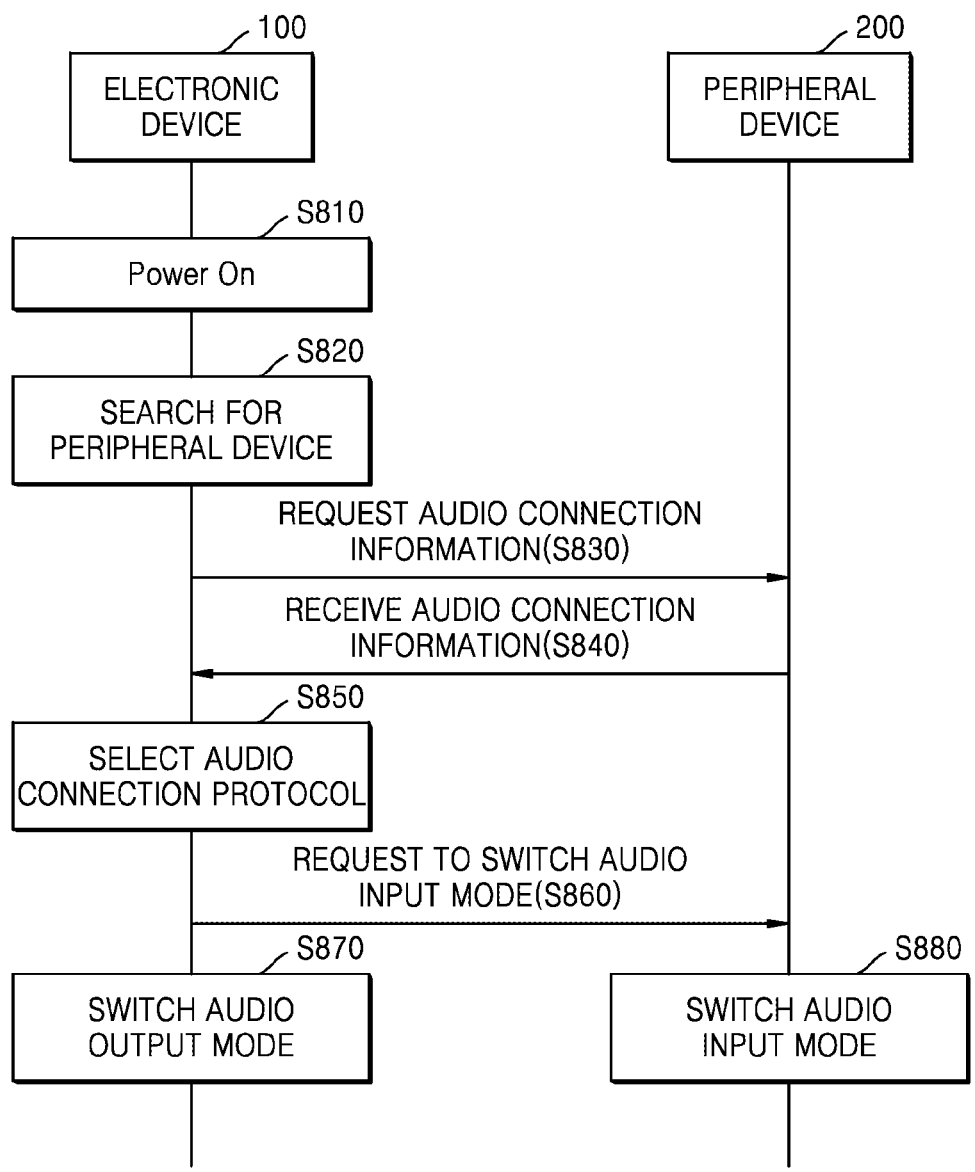
FIG. 8 is a flowchart illustrating an example method of establishing an audio connection between an electronic device and a peripheral device, according to an example embodiment.

FIG. 8 is a flowchart illustrating an example method of establishing an audio connection between an electronic device and a peripheral device, according to an example embodiment.

FIG. 8 illustrates an embodiment that the electronic device 100 is turned on when the peripheral device 200 is already turned on.

Referring to FIG. 8, the electronic device 100 may be turned on (operation S810).

When the electronic device 100 is turned on, the electronic device 100 may perform wireless communication and search for the peripheral device 200 (operation S820). However, the present disclosure is not limited thereto. When there is a peripheral device connected to the electronic device 100 via a wire, the electronic device 100 may perform a wired communication and recognize existence of the peripheral device.

The electronic device 100 may request audio connection information to the found peripheral device 200 (operation S830).

The electronic device 100 may receive audio connection information from the peripheral device 200 (operation S840). Since audio connection information is described above in detail with reference to FIG. 7, detailed description thereof will be omitted.

When audio connection information is received, the electronic device 100 may select an audio connection protocol (operation S850).

For example, the electronic device 100 may select one of at least one audio connection protocol via which the peripheral device 200 may be connected to the electronic device 100 based on priorities of audio connection protocols. Since detailed description thereof is given above in relation to the operation S740 of FIG. 7, detailed description thereof will be omitted.

When an audio connection protocol is selected, the electronic device 100 may request the peripheral device 200 to switch an audio input mode thereof to an audio input mode corresponding to the selected audio connection protocol (operation S860). In response to the request, the peripheral device 200 may switch an audio input mode thereof (operation S880). Furthermore, the electronic device 100 may switch an audio output mode thereof to an audio output mode corresponding to the selected audio connection protocol (operation S870).

Figure 9:
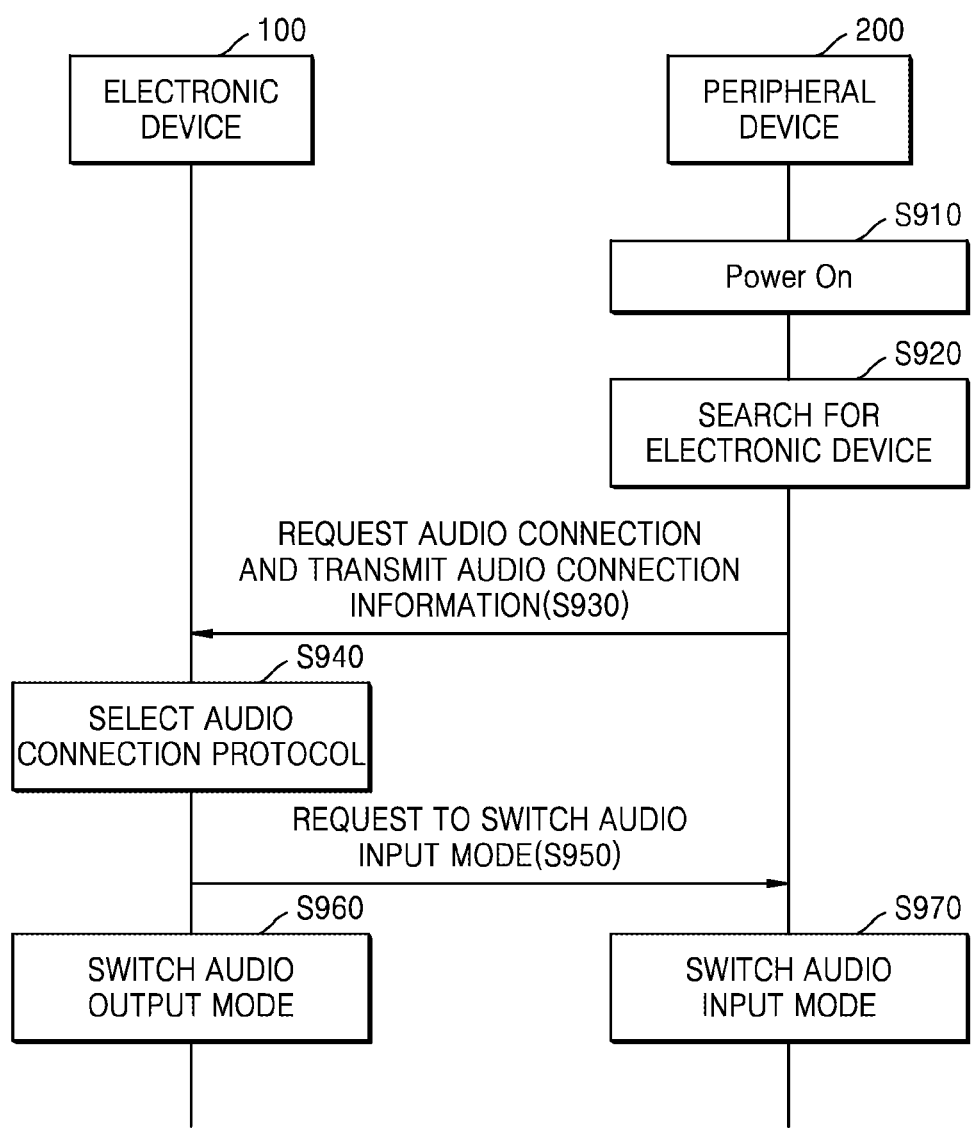
FIG. 9 is a flowchart illustrating an example method of establishing an audio connection between an electronic device and a peripheral device, according to an example embodiment.

FIG. 9 is a flowchart illustrating an example method of establishing an audio connection between an electronic device and a peripheral device, according to an example embodiment.

FIG. 9 illustrates an embodiment in which the peripheral device 200 is turned on when the electronic device 100 is already turned on.

Referring to FIG. 9, the peripheral device 200 may be turned on (operation S910).

When the peripheral device 200 is turned on, the peripheral device 200 may perform wireless communication and search for the electronic device 100 in the surrounding (operation S920). However, the present disclosure is not limited thereto. When there is the electronic device 100 connected to the peripheral device 200 via a wire, the peripheral device 200 may perform a wired communication and recognize existence of the electronic device 100.

The peripheral device 200 may transmit an audio connection request and audio connection information to the found electronic device 100 (operation S930). Since audio connection information is described above in detail with reference to FIG. 7, detailed description thereof will be omitted.

The electronic device 100 may select an audio connection protocol based on the received audio connection information (operation S940).

For example, the electronic device 100 may select one of at least one audio connection protocol via which the peripheral device 200 may be connected to the electronic device 100 based on priorities of audio connection protocols. Since detailed description thereof is given above in relation to the operation S740 of FIG. 7, detailed description thereof will be omitted.

When an audio connection protocol is selected, the electronic device 100 may request the peripheral device 200 to switch an audio input mode thereof to an audio input mode corresponding to the selected audio connection protocol (operation S950). In response to the request, the peripheral device 200 may switch an audio input mode thereof (operation S970). Furthermore, the electronic device 100 may switch an audio output mode thereof to an audio output mode corresponding to the selected audio connection protocol (operation S960).

Figure 10:
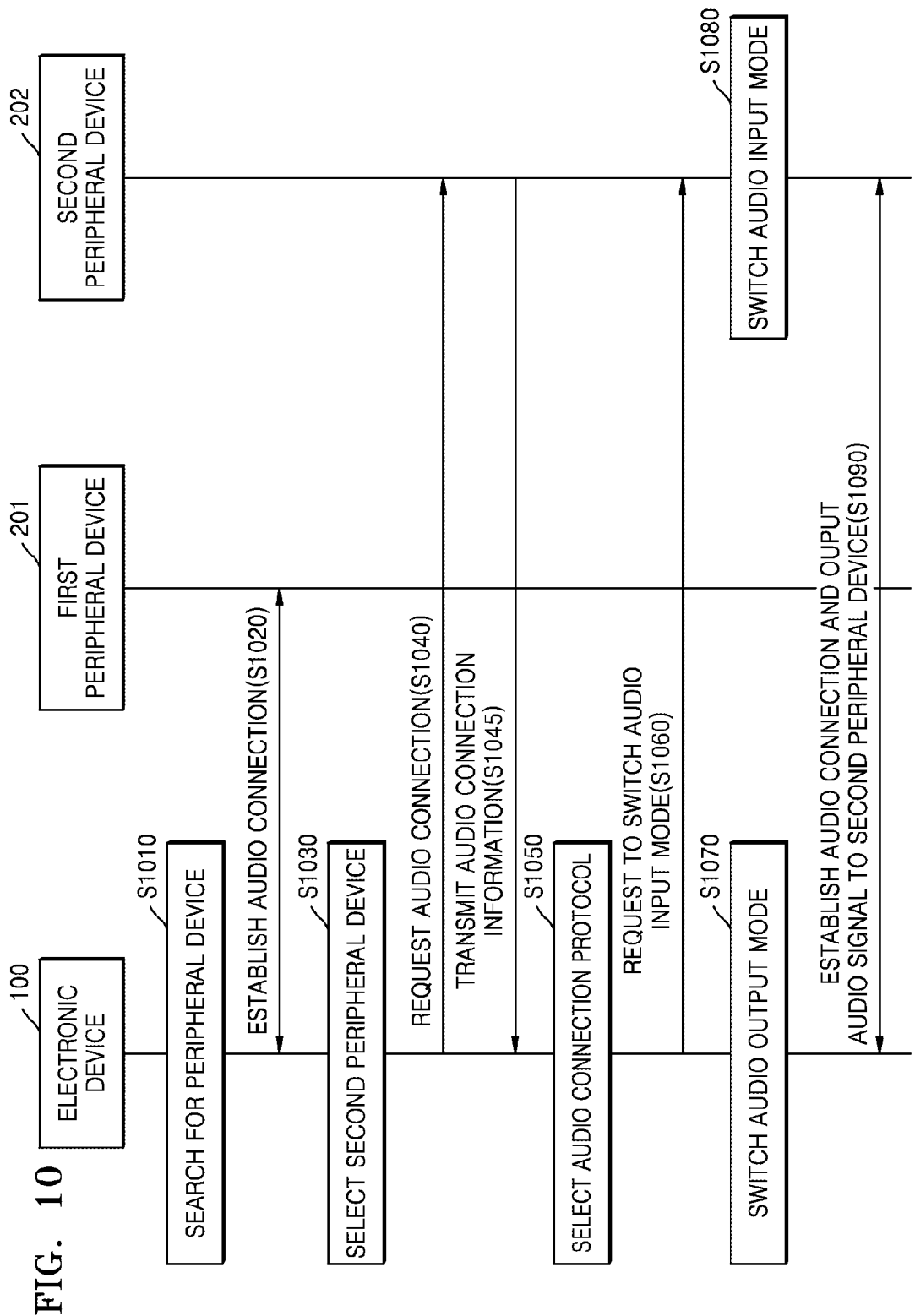
FIG. 10 is a flowchart illustrating an example method of establishing an audio connection between an electronic device and a peripheral device, according to an example embodiment.

FIG. 10 is a flowchart illustrating an example method of establishing an audio connection between an electronic device and a peripheral device, according to an example embodiment.

Referring to FIG. 10, the electronic device 100 may perform wireless communication and search for a peripheral device (operation S1010).

The electronic device 100 may output an audio signal using a first peripheral device 201 from among found peripheral devices (operation S1020). When an audio connection is established to the first peripheral device 201, the electronic device 100 may detect a user input for selecting a second peripheral device 202 from among the found peripheral device (operation S1030).

When the user input for selecting a second peripheral device 202 is detected, the electronic device 100 may request an audio connection to the second peripheral device 202 (operation S1040).

The second peripheral device 202 may transmit audio connection information to the electronic device 100 (operation S1045). Since audio connection information is described above in detail with reference to FIG. 7, detailed description thereof will be omitted.

The electronic device 100 may select an audio connection protocol based on the received audio connection information (operation S1050).

For example, the electronic device 100 may select one of at least one audio connection protocol via which the second peripheral device 202 may be connected to the electronic device 100 based on priorities of audio connection protocols. Since detailed description thereof is given above in relation to the operation S740 of FIG. 7, detailed description thereof will be omitted.

When an audio connection protocol is selected, the electronic device 100 may request the second peripheral device 202 to switch an audio input mode thereof to an audio input mode corresponding to the selected audio connection protocol (operation S1060). In response to the request, the second peripheral device 202 may switch an audio input mode thereof (operation S1080).

Furthermore, the electronic device 100 may switch an audio output mode thereof to an audio output mode corresponding to the selected audio connection protocol (operation S1070).

The electronic device 100 may output an audio signal to the second peripheral device 202 based on the selected audio connection protocol (operation S1090).

Here, the connection to the first peripheral device 201 that was previously outputting audio signals may be terminated. However, the present disclosure is not limited thereto. The electronic device 100 may output an audio signal in surround by using the first peripheral device 201 and the second peripheral device 202.

Figure 11:
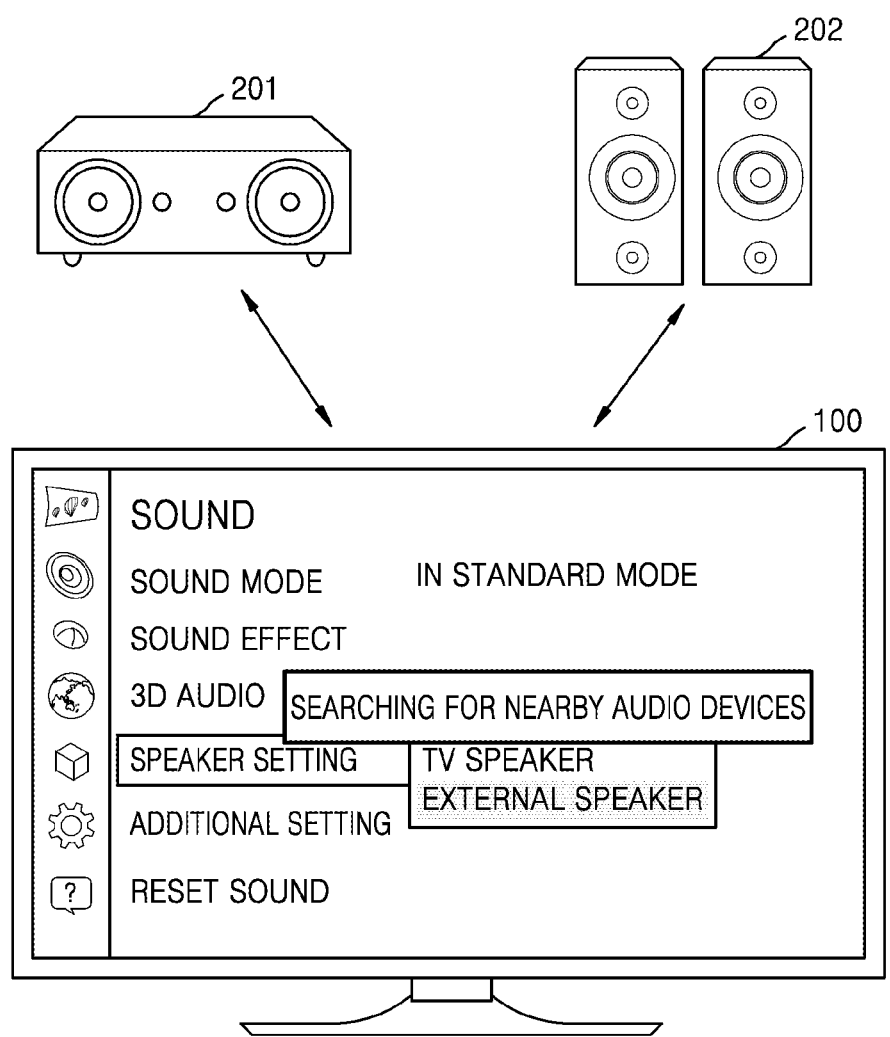
FIG. 11 is a diagram illustrating an example in which an electronic device according to an example embodiment searches for a peripheral device.

FIG. 11 is a diagram illustrating an example in which an electronic device according to an example embodiment searches for a peripheral device.

Referring to FIG. 11, the electronic device 100 may perform wireless communication and search for a peripheral device (e.g., an audio device).

The electronic device 100 may search for an audio device in the surrounding when power-on of the electronic device 100 is detected or an input for selecting an external speaker is detected via a speaker setting menu. However, the present disclosure is not limited thereto, and the electronic device 100 may also periodically search for an audio device in the surrounding.

As illustrated in FIG. 11, the electronic device 100 may search for the first audio device 201 and the second audio device 202 in the surrounding. Each of the first audio device 201 and the second audio device 202 may be a peripheral device including at least one audio connection protocol to be connected to the electronic device 100.

Figure 12:
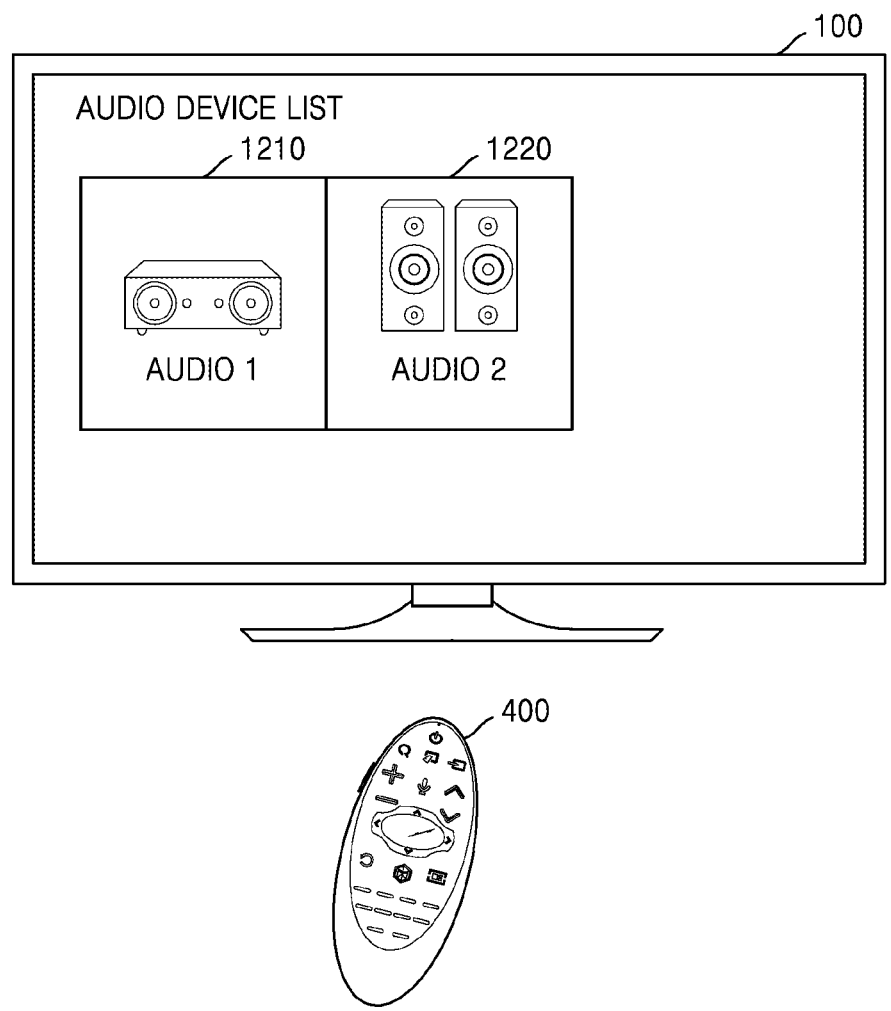
FIG. 12 is a diagram illustrating an example in which an electronic device according to an example embodiment displays a list of found peripheral devices on a display.

FIG. 12 is a diagram illustrating an example in which an electronic device according to an example embodiment displays a list of found peripheral devices on a display.

As described above with reference to FIG. 11, the electronic device 100 may find the first audio device 201 and the second audio device 202, each of which includes at least one audio connection protocol to be connected to the electronic device 100.

When the first audio device 201 and the second audio device 202 are found, the electronic device 100 may display an audio device list including a first icon 1210 indicating the first audio device 201 and a second icon 1220 indicating the second audio device 202.

Furthermore, the electronic device 100 may display a model name of the first audio device 201, a brief description of the first audio device 201, a model name of the second audio device 202, and a brief description of the first audio device 201 together with the first icon 1210 and the second icon 1220.

The electronic device 100 may detect a user input for selecting one icon in the audio device list. For example, a user may select an icon by using the control device 400.

The electronic device 100 may select an audio connection protocol with regard to an audio device corresponding to the selected icon. For example, when an input for selecting the first icon 1210 is detected, the electronic device 100 may select an audio connection protocol with regard to the first audio device 201. For example, the electronic device 100 may select one of audio connection protocols via which the first audio device 201 may be connected to the electronic device 100 based on priorities of the audio connection protocols. The electronic device 100 may output an audio signal to the first audio device 201 based on the selected audio connection protocol.

Alternatively, when an input for selecting the second icon 1220 is detected, the electronic device 100 may select an audio connection protocol with regard to the second audio device 202. For example, the electronic device 100 may select one of audio connection protocols via which the second audio device 202 may be connected to the electronic device 100 based on priorities of the audio connection protocols. The electronic device 100 may output an audio signal to the second audio device 202 based on the selected audio connection protocol.

Figure 13:
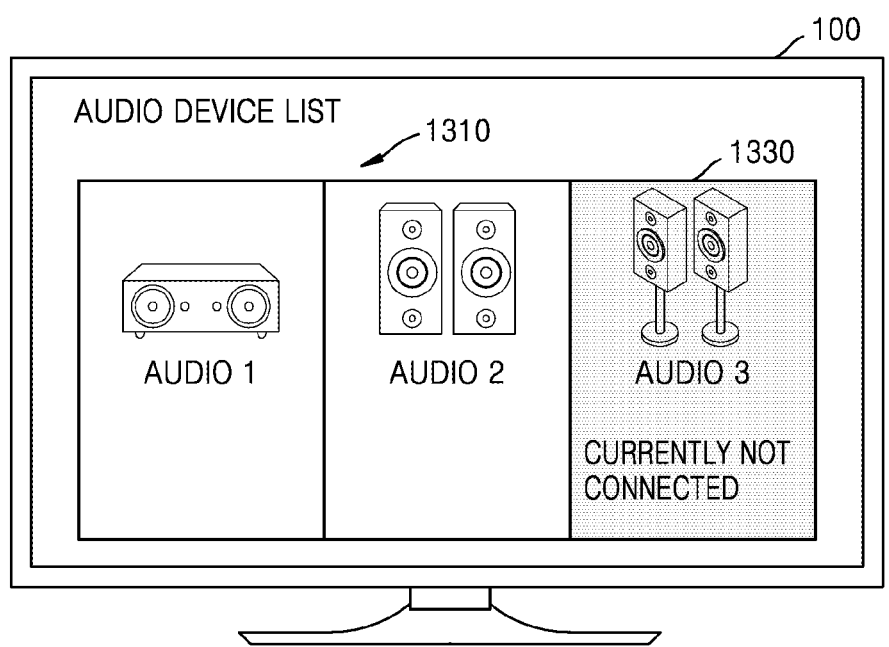
FIG. 13 is a diagram illustrating an example in which an electronic device according to an example embodiment displays a list of found peripheral devices on a display.

FIG. 13 is a diagram illustrating an example in which an electronic device according to an example embodiment displays a list of found peripheral devices on a display.

As described above with reference to FIGS. 11 and 12, the electronic device 100 may search for audio devices (a first audio device and a second audio device) each of which includes at least one audio connection protocol to be connected to the electronic device 100 and display a list 1310 showing found audio devices.

Referring to FIG. 13, the electronic device 100 may display a third icon 1330 indicating an audio device that has been previously found and is not currently found (e.g., a third audio device). Furthermore, the electronic device 100 may display the third icon 1330 as an inactive icon. Furthermore, when an audio device corresponding to the third icon 1330 is found, the electronic device 100 may display the third icon 1330 as an active icon.

Figure 14:
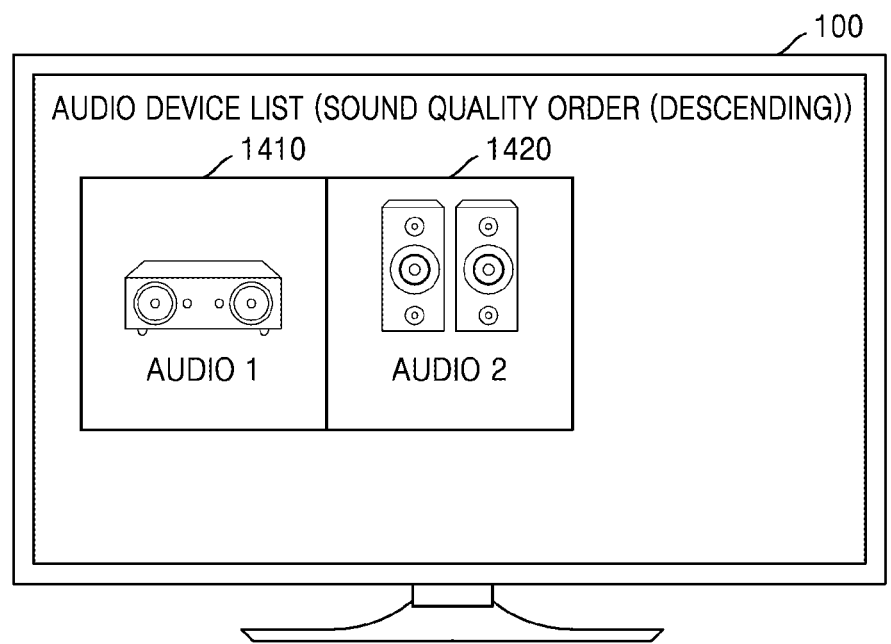
FIG. 14 is a diagram illustrating an example in which an electronic device according to an example embodiment displays a list of found peripheral devices on a display.

FIG. 14 is a diagram illustrating an example in which an electronic device according to an example embodiment displays a list of found peripheral devices on a display.

As described above with reference to FIGS. 11 and 12, the electronic device 100 may search for audio devices (a first audio device and a second audio device) each of which includes at least one audio connection protocol to be connected to the electronic device 100 and display a list showing found audio devices.

Referring to FIG. 14, the electronic device 100 may select an audio connection protocol with regard to each of the found audio devices based on priorities of audio connection protocols. Here, priorities of audio connection protocols may be pre-set based on sound quality of audio signals output based on the respective audio connection protocols. Therefore, an audio connection protocol selected with regard to each audio device may be the audio connection protocol for outputting audio signal at the highest quality from the corresponding audio device.

Furthermore, the electronic device 100 may display icons 1410 and 1420 indicating the found audio devices in the audio device list in the descending order of sound qualities.

For example, when a first audio connection protocol selected with regard to the first audio device 201 is compared to a second audio connection protocol selected with regard to the second audio device 202 and the first audio connection protocol is a connection protocol for outputting audio signals at higher quality as compared to the second audio connection protocol, the icons 1410 and 1420 may be displayed, such that the icon 1410 indicating the first audio device 201 may be is displayed before the icon 1420 indicating the second audio device 202. However, the present disclosure is not limited thereto.

Figure 15:
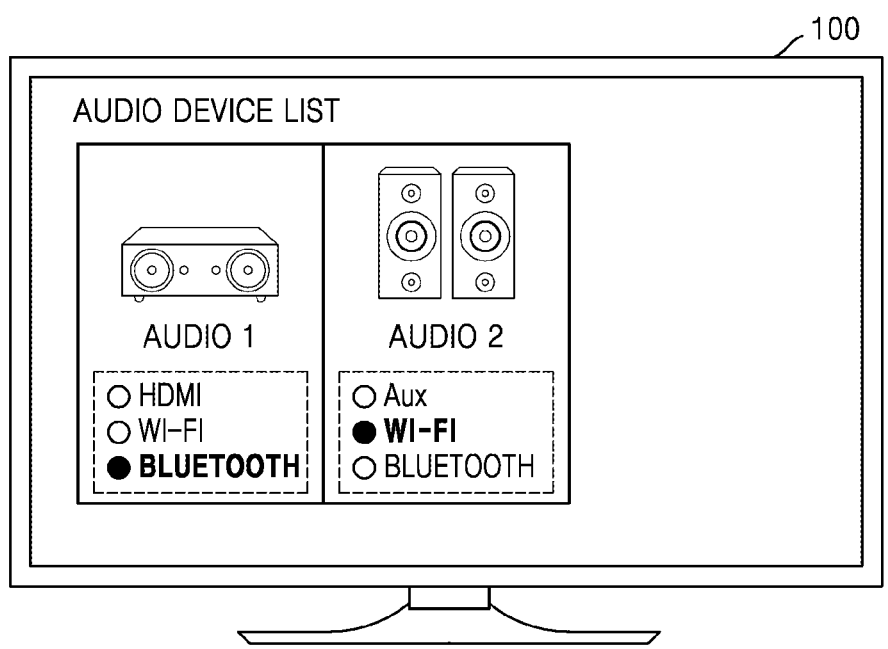
FIG. 15 is a diagram illustrating an example in which an electronic device according to an example embodiment displays a list of found peripheral devices on a display.

FIG. 15 is a diagram illustrating an example in which an electronic device according to an example embodiment displays a list of found peripheral devices on a display.

As described above with reference to FIGS. 11 and 12, the electronic device 100 may search for audio devices (a first audio device and a second audio device) each of which includes at least one audio connection protocol to be connected to the electronic device 100 and display a list showing found audio devices.

Referring to FIG. 15, the electronic device 100 may select an audio connection protocol with regard to each of the found audio devices based on priorities of audio connection protocols.

The electronic device 100 may display audio connection protocols supported by an audio device and display an audio connection protocol selected from among the supported audio connection protocols differently from the remaining audio connection protocols.

For example, as illustrated in FIG. 15, audio connection protocols supported by the first audio device 201 (audio 1) may include an HDMI connection protocol, a Wi-Fi connection protocol, and Bluetooth connection protocol. Here, when no HDMI cable is connected between the first audio device 201 and the electronic device 100 and the first audio device 201 is not connected to the electronic device 100 via a Wi-Fi connection, the electronic device 100 may select the Bluetooth connection protocol as a first audio connection protocol with regard to the first audio device 201.

In this case, the electronic device 100 may display that the HDMI connection protocol, the Wi-Fi connection protocol, and the Bluetooth connection protocol are available and highlight the Bluetooth connection protocol to inform that the Bluetooth connection protocol is selected.

Therefore, a user may easily recognize that the Bluetooth connection protocol is selected and the HDMI connection protocol and the Wi-Fi connection protocol are also available and, if necessary, may output audio signals at high quality by connecting a HDMI cable or connecting the electronic device 100 and the first audio device 201 via the Wi-Fi connection protocol.

Furthermore, audio connection protocols supported by the second audio device 202 (audio 2) may include an Aux connection protocol, a Wi-Fi connection protocol, and Bluetooth connection protocol. Here, when no Aux cable is connected between the second audio device 202 and the electronic device 100 and the second audio device 202 is connected to the electronic device 100 via a Wi-Fi connection and a Bluetooth connection, the electronic device 100 may select the Wi-Fi connection protocol as a second audio connection protocol with regard to the second audio device 202.

In this case, the electronic device 100 may display that the Aux connection protocol, the Wi-Fi connection protocol, and the Bluetooth connection protocol are available and highlight the Wi-Fi connection protocol to inform that the Wi-Fi connection protocol is selected.

Therefore, a user may easily recognize that the Wi-Fi connection protocol is selected and the Aux connection protocol and the Bluetooth connection protocol are also available and, if necessary, may output audio signals at high quality by connecting an Aux cable.

Figure 16:
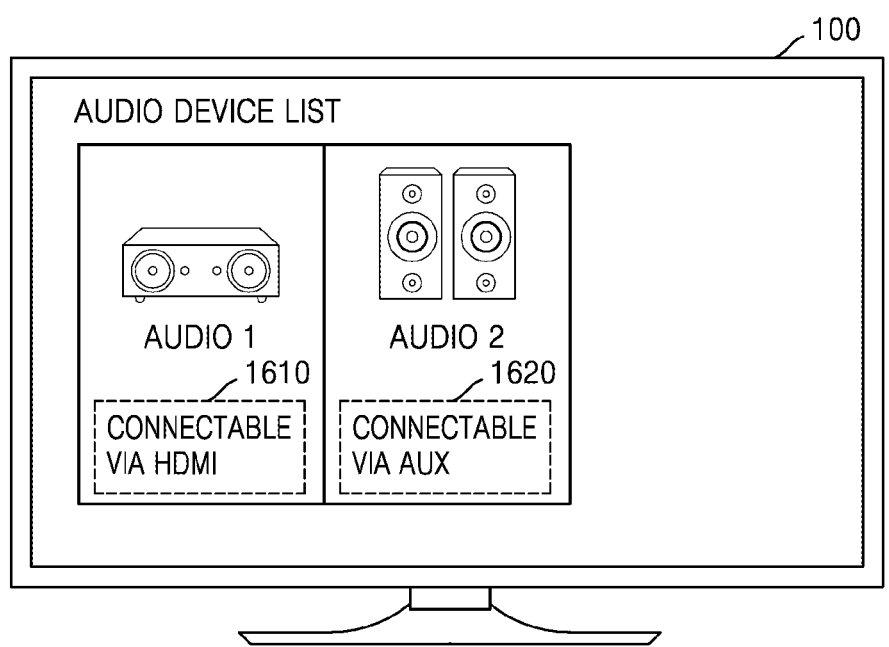
FIG. 16 is a diagram illustrating an example in which an electronic device according to an example embodiment displays a list of found peripheral devices on a display.

FIG. 16 is a diagram illustrating an example in which an electronic device according to an example embodiment displays a list of found peripheral devices on a display.

As described above with reference to FIGS. 11 and 12, the electronic device 100 may search for audio devices (a first audio device and a second audio device) each of which includes at least one audio connection protocol to be connected to the electronic device 100 and display a list showing found audio devices.

Referring to FIG. 16, the electronic device 100 may select an audio connection protocol with regard to each of the found audio devices based on priorities of audio connection protocols.

When an audio device supports an audio connection protocol having a higher priority than an audio connection protocol selected with regard to the corresponding audio device, the electronic device 100 may display a message indicating that an audio connection may be established via the corresponding audio connection protocol.

For example, the first audio device 201 (audio 1) may support a HDMI connection protocol, a Wi-Fi connection protocol, and Bluetooth connection protocol. Here, when no HDMI cable is connected and the first audio device 201 may be connected to the electronic device 100 based on the Wi-Fi connection protocol and the Bluetooth connection protocol, the electronic device 100 may select the Wi-Fi connection protocol, which has a higher priority than the Bluetooth connection protocol, as a connection protocol with regard to the first audio device 201 based on priorities of the Wi-Fi connection protocol and the Bluetooth connection protocol.

Furthermore, the electronic device 100 may display a message 1610 indicating that a HDMI connection having a higher priority than the selected Wi-Fi connection protocol may be established.

Furthermore, the second audio device 202 (audio 2) may support an Aux connection protocol, a Wi-Fi connection protocol, and Bluetooth connection protocol. Here, when no Aux cable is connected and the Wi-Fi connection protocol is selected, the electronic device 100 may display a message 1620 indicating that an Aux connection having a higher priority than the selected Wi-Fi connection protocol may be established.

Figure 17:
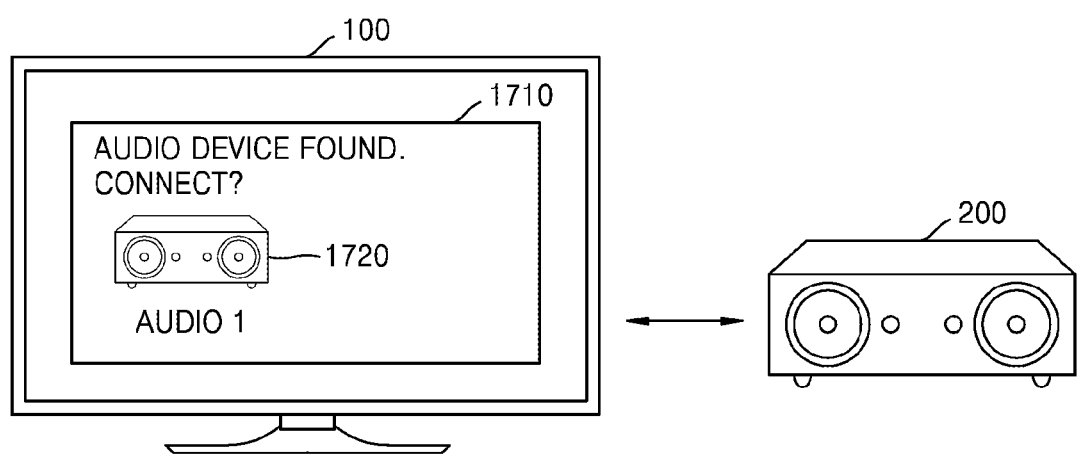
FIG. 17 is a diagram illustrating an example screen image displayed on a display of an electronic device according to an example embodiment when a peripheral device is found.

FIG. 17 is a diagram illustrating an example screen image displayed on a display of an electronic device according to an example embodiment when a peripheral device is found.

Referring to FIG. 17, the electronic device 100 may output an audio signal using a speaker included in the electronic device 100.

Here, a peripheral device nearby the electronic device 100 may be turned on. When the peripheral device is turned on, the peripheral device may perform wireless communication and search for the nearby electronic device 100. However, the present disclosure is not limited thereto. When the electronic device 100 is connected to the peripheral device 200 via a wire, the peripheral device 200 may perform a wired communication and search for the electronic device 100.

The peripheral device 200 may transmit audio connection information regarding the peripheral device 200 to the found electronic device 100.

The electronic device 100 may display a message 1710 indicating that the peripheral device 200 is found. Furthermore, the electronic device 100 may display an icon 1720 indicating the found peripheral device, a model name of the peripheral device, and a brief description thereof. Here, when an input for selecting an icon is detected, the electronic device 100 may select an audio connection protocol based on audio connection information corresponding to the selected icon.

For example, based on priorities of audio connection protocols, the electronic device 100 may select one of at least one audio connection protocol for connecting the peripheral device 200 (audio 1) to the electronic device 100.

When an audio connection protocol is selected, the electronic device 100 may output an audio signal to the peripheral device 200 based on the selected audio connection protocol.

Figure 18:
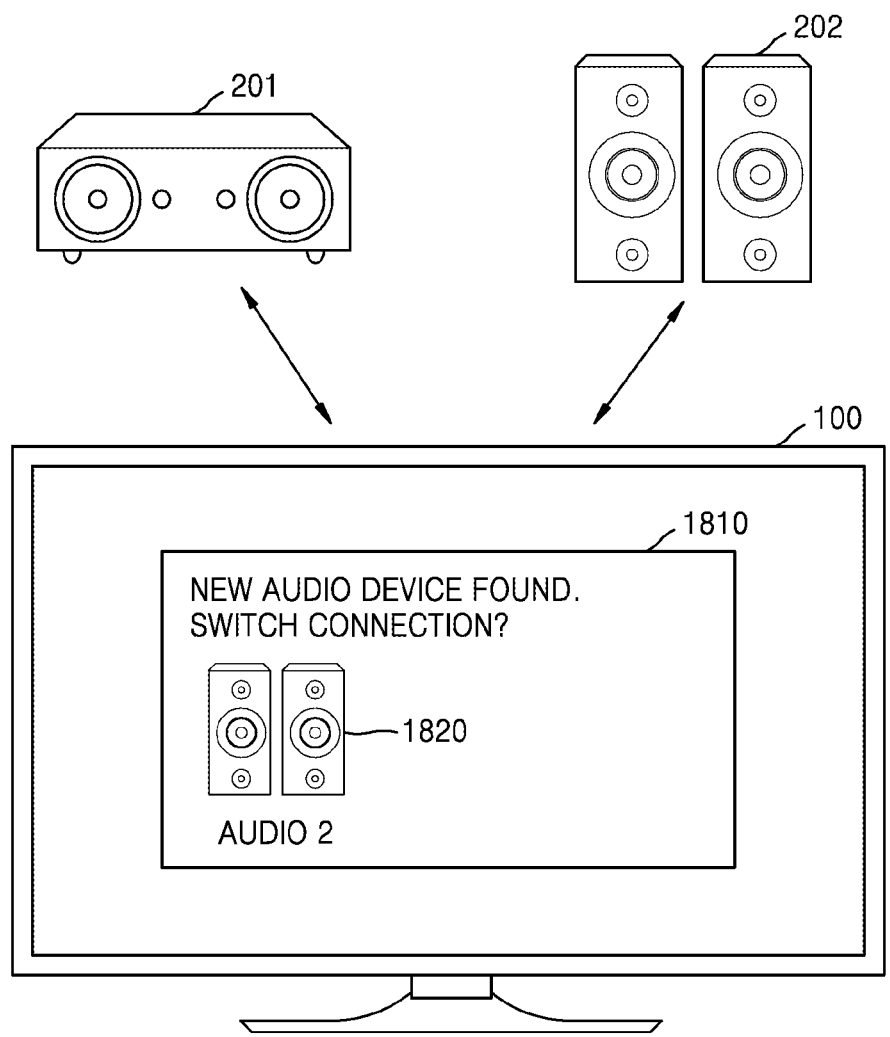
FIG. 18 is a diagram illustrating an example screen image displayed on a display of an electronic device according to an example embodiment when a peripheral device is found.

FIG. 18 is a diagram illustrating an example screen image displayed on a display of an electronic device according to an example embodiment when a peripheral device is found.

Referring to FIG. 18, the electronic device 100 may output an audio signal using the first audio device 201.

Here, the second audio device 202 nearby the electronic device 100 may be turned on. When the second audio device 202 is turned on, the second audio device 202 may perform wireless communication and search for the nearby electronic device 100. However, the present disclosure is not limited thereto, and the second audio device 202 may perform a wired communication and search for the electronic device 100.

The second audio device 202 may transmit audio connection information regarding the second audio device 202 to the found electronic device 100.

The electronic device 100 may display a message 1810 indicating that the second audio device 202 is found. Furthermore, the electronic device 100 may display an icon 1720 indicating the found second audio device 202 (audio 2), a model name of the second audio device 202, and a brief description thereof. Here, when an input for selecting the icon 1820 indicating the second audio device 202 is detected, the electronic device 100 may select an audio connection protocol with regard to the second audio device 202 based on the audio connection information regarding the second audio device 202. For example, based on priorities of audio connection protocols, the electronic device 100 may select one of at least one audio connection protocol for connecting the second audio device 202 to the electronic device 100.

When an audio connection protocol is selected, the electronic device 100 may output an audio signal to the second audio device 202 based on the selected audio connection protocol.

Here, the connection to the first audio device 201 that was previously outputting audio signals may be terminated. However, the present disclosure is not limited thereto. The electronic device 100 may output an audio signal in surround by using the first audio device 201 and the second audio device 202.

Figure 19:
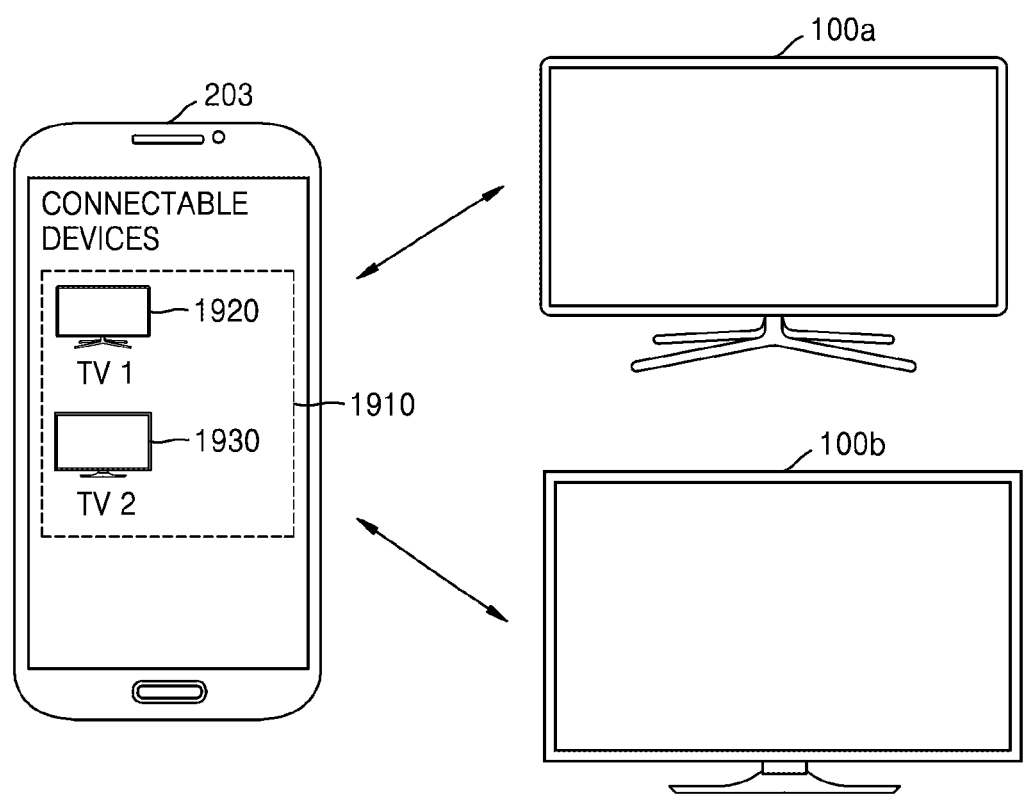
FIG. 19 is a diagram illustrating an example method by which a peripheral device according to an example embodiment searches for an electronic device and establishes an audio connection thereto.

FIG. 19 is a diagram illustrating an example method by which a peripheral device according to an example embodiment searches for an electronic device and establishes an audio connection thereto.

Referring to FIG. 19, a peripheral device 203 according to an example embodiment may be a mobile device. However, the present disclosure is not limited thereto.

The mobile device 203 may perform wireless communication and search for an electronic device that may be connected to the mobile device 203 in the surrounding. When the mobile device 203 finds an electronic device, the mobile device 203 may display an electronic device list 1910 including an icon indicating the found electronic device. For example, as illustrated in FIG. 19, the electronic device list 1910 may include a first icon 1920 indicating a first image display device 100a (TV1) and a second icon 1930 indicating a second image display device 100b (TV 2). Furthermore, the mobile device 203 may display model names or brief descriptions of electronic devices.

When an input for selecting an icon in the electronic device list 1910 is detected, the mobile device 203 may transmit audio connection information regarding the mobile device 203 to an electronic device corresponding to the selected icon. For example, when an input for selecting the first icon 1920 is detected, the mobile device 203 may transmit audio connection information regarding the mobile device 203 to the image display device 100a.

The image display device 100a may select one of at least one audio connection protocol for connecting the mobile device 203 to the image display device 100 based on priorities of audio connection protocols.

When an audio connection protocol is selected, the image display device 100a may output an audio signal to the mobile device 203 based on the selected audio connection protocol. Furthermore, the mobile device 203 may output an audio signal input by the image display device 100a.

Embodiments of the present disclosure may provide an electronic device that automatically provides the best or better connection protocol based on a current wire/wireless connection state when the electronic device is connected to an external audio device and a method of operating the electronic device. According to an example embodiment, since an electronic device automatically provides the best audio connection protocol, a complicated setting process for connecting the electronic device to an audio device may be omitted.

According to an embodiment, an electronic device and an audio device may be easily connected to each other with an input for selecting an icon that indicates the audio device and is displayed at the electronic device, and thus user convenience may be improved.

According to an embodiment, an electronic device may automatically provide an audio connection protocol for outputting a highest quality audio from among a plurality of audio connection protocols.

The above-described example embodiments of the present disclosure may be implemented as programmable instructions executable by a variety of computer components and stored in a non-transitory computer readable recording medium. The non-transitory computer readable recording medium may include program instructions, a data file, a data structure, or any combination thereof. The program instructions stored in the non-transitory computer readable recording medium may be designed and configured specifically for the present disclosure or can be publicly known and available to those of ordinary skill in the field of software. Examples of the non-transitory computer readable recording medium include a hardware device specially configured to store and perform program instructions, for example, a magnetic medium, such as a hard disk, a floppy disk, and a magnetic tape, an optical recording medium, such as a CD-ROM, a DVD, and the like, a magneto-optical medium, such as a floptical disc, ROM, RAM, a flash memory, and the like. Examples of the program instructions include machine codes made by, for example, a compiler, as well as high-level language codes executable by a computer using an interpreter.

While one or more example embodiments have been described with reference to the figures, it will be understood by those of ordinary skill in the art that various changes in form and details may be made therein without departing from the spirit and scope as defined by the following claims.

What is claimed is:

1. An electronic device comprising:
   communication circuitry configured to perform wireless communication using a plurality of wireless connection protocols;
   a processor;
   a memory coupled to the processor and comprising instructions executable by the processor, the processor being operable when executing the instructions to:
   search at least one peripheral device via the communication circuitry,
   receive, from the searched at least one peripheral device, information indicating a plurality of wireless connection protocols for connecting the at least one peripheral device to the electronic device,
   select one of the plurality of wireless connection protocols based on pre-set priorities of the wireless connection protocols; and
   output an audio signal, via the selected wireless connection protocol, to the peripheral device.

2. The electronic device of claim 1, further comprising a display,
   wherein the processor is further operable when executing the instructions to:
   display an icon corresponding to the at least one peripheral device on the display; and
   output the audio signal to the at least one peripheral device based on the selected wireless connection protocol when an input for selecting the icon is received.

3. The electronic device of claim 1, wherein the at least one peripheral device comprises a first peripheral device and a second peripheral device,
   the electronic device further comprises a display, and
   the processor is further operable when executing the instructions to:
   display a first icon corresponding to the first peripheral device and a second icon corresponding to the second peripheral device on the display;
   output the audio signal to the first peripheral device based on a first audio wireless connection protocol selected with regard to the first peripheral device when an input for selecting the first icon is received; and
   output the audio signal to the second peripheral device based on a second wireless connection protocol selected with regard to the second peripheral device when an input for selecting the second icon is received.

4. The electronic device of claim 1,
   wherein the processor is further operable when executing the instructions to:
   receive an audio connection request from the at least one peripheral device, and
   select one of the at least one wireless connection protocol when the audio connection request is received.

5. The electronic device of claim 1, wherein the processor is further operable when executing the instructions to:
   transmit, via the communication circuitry, a request for switching an audio input mode to an audio input mode corresponding to the selected wireless connection protocol to the at least one peripheral device.

6. The electronic device of claim 1, wherein the processor is further operable when executing the instructions to:
   switch an audio output mode to an audio output mode corresponding to the selected wireless connection protocol.

7. The electronic device of claim 1, wherein the priorities of the wireless connection protocols are set in advance based on qualities of audio signals output based on the respective wireless connection protocols.

8. The electronic device of claim 1, wherein the processor is further operable when executing the instructions to:
   receive, from the searched at least one peripheral device, information indicating at least one wired connection protocol for connecting the at least one peripheral device to the electronic device, and
   the priority of the at least one wired connection protocol is set to be higher than the priority of the plurality of wireless connection protocol.

9. The electronic device of claim 8, wherein the wired connection protocol comprises at least one of: an HDMI connection protocol, an optical connection protocol, and an Aux connection protocol, and
   priorities of the HDMI connection protocol, the optical connection protocol, and the Aux connection protocol decrease from high to low in the order of the HDMI connection protocol, the optical connection protocol, and the Aux connection protocol.

10. The electronic device of claim 8, wherein the wireless connection protocol comprises at least one of: a Bluetooth connection protocol and a Wi-Fi connection protocol, and
    the priority of the Wi-Fi connection protocol is set to be higher than the priority of the Bluetooth connection protocol.

11. A method of operating an electronic device, the method comprising:
    searching at least one peripheral device via communication circuitry,
    receiving, from the searched at least one peripheral device, information indicating a plurality of wireless connection protocols for connecting the at least one peripheral device to the electronic device,
    selecting one of the plurality of wireless connection protocols based on pre-set priorities of wireless connection protocols; and
    outputting an audio signal, via the selected wireless connection protocol, to the peripheral device.

12. The method of claim 11, further comprising displaying an icon corresponding to the at least one peripheral device,
    wherein, when an input for selecting the icon is received, the audio signal is output to the at least one peripheral device based on the selected wireless connection protocol.

13. The method of claim 11, wherein the at least one peripheral device comprises a first peripheral device and a second peripheral device,
    the method further comprising: displaying a first icon corresponding the first peripheral device and a second icon corresponding to the second peripheral device on a display, and
    the outputting of the audio signal to the peripheral device comprises:
    outputting the audio signal to the first peripheral device based on a first wireless connection protocol selected with regard to the first peripheral device when an input for selecting the first icon is received; and
    outputting the audio signal to the second peripheral device based on a second wireless connection protocol selected with regard to the second peripheral device when an input for selecting the second icon is received.

14. The method of claim 11, further comprising: receiving an audio connection request from the at least one peripheral device, wherein, when the audio connection request is received, one of the at least one wireless connection protocol is selected.

15. The method of claim 11, further comprising: transmitting a request for switching an audio input mode to an audio input mode corresponding to the selected wireless connection protocol to the at least one peripheral device.

16. The method of claim 11, wherein the priorities of the wireless connection protocols are set in advance based on qualities of audio signals output based on the respective wireless connection protocols.

17. The method of claim 11, further comprising receiving information on at least one wired connection protocol, and the priority of the at least one wired connection protocol is set to be higher than the priority of the at least one wireless connection protocol.

18. The method of claim 17, wherein the wired connection protocol comprises at least one of: an HDMI connection protocol, an optical connection protocol, and an Aux connection protocol, and priorities of the HDMI connection protocol, the optical connection protocol, and the Aux connection protocol decrease from high to low in the order of the HDMI connection protocol, the optical connection protocol, and the Aux connection protocol.

19. The method of claim 17, wherein the wireless connection protocol comprises at least one of a Bluetooth connection protocol and a Wi-Fi connection protocol, and the priority of the Wi-Fi connection protocol is set to be higher than the priority of the Bluetooth connection protocol.

20. A non-transitory computer readable recording medium having recorded thereon a computer program which, when executed by a processor, cause the electronic device to perform the method of claim 11.

21. The electronic device of claim 1, wherein the processor is further operable when executing the instructions to:

perform wireless connection via each of the plurality of wireless connection protocols based on the information indicating the plurality of wireless connection protocols, select one of the plurality of wireless connection protocols based on the pre-set priorities of the wireless connection protocols, and output the audio signal, via the selected wireless connection protocol.

22. The method of claim 11, further comprising:

performing wireless connection via each of the plurality of wireless connection protocols based on the information indicating the plurality of wireless connection protocols, selecting one of the plurality of wireless connection protocols based on the pre-set priorities of the wireless connection protocols, and outputting the audio signal, via the selected wireless connection protocol.

* * * * *